US008387734B2

(12) United States Patent
Krosschell et al.

(10) Patent No.: US 8,387,734 B2
(45) Date of Patent: Mar. 5, 2013

(54) LOW SPEED VEHICLE

(75) Inventors: Brian D Krosschell, Chisago City, MN (US); Mark W Chevalier, Andover, MN (US); Bryan K Johnson, Minneapolis, MN (US); Brian T Utter, Greenbush, MN (US); Gregory C Brew, Minnetonka, MN (US); Ryan J Andreae, Montrose, MN (US); Adam J Schlangen, Rush City, MN (US)

(73) Assignee: Polaris Industries Inc., Medina, MN (US)

(*) Notice: Subject to any disclaimer, the term of this patent is extended or adjusted under 35 U.S.C. 154(b) by 213 days.

(21) Appl. No.: 12/660,971

(22) Filed: Mar. 8, 2010

(65) Prior Publication Data

US 2010/0225082 A1    Sep. 9, 2010

Related U.S. Application Data

(60) Provisional application No. 61/158,160, filed on Mar. 6, 2009.

(51) Int. Cl.
*B62D 39/00* (2006.01)

(52) U.S. Cl. ...................... 180/89.11; 296/64

(58) Field of Classification Search ........... 180/89.1, 180/89.11, 90.6, 311, 312, 905, 908; 296/64, 296/65.01, 66, 102
See application file for complete search history.

(56) References Cited

U.S. PATENT DOCUMENTS

| 2,822,969 | A | | 2/1958 | Cooper | |
|---|---|---|---|---|---|
| 2,836,254 | A | * | 5/1958 | Boehner | 180/56 |
| 3,671,071 | A | | 6/1972 | Evinrude | |
| 4,125,284 | A | | 11/1978 | Hicks et al. | |
| 5,429,290 | A | | 7/1995 | Greene, Jr. | |
| 5,697,320 | A | * | 12/1997 | Murray | 114/361 |
| 5,732,788 | A | * | 3/1998 | Brown | 180/326 |
| 5,902,009 | A | | 5/1999 | Singh et al. | |
| 5,915,495 | A | * | 6/1999 | Kerlin et al. | 180/291 |
| 6,050,268 | A | | 4/2000 | San Filippo | |
| 6,053,570 | A | | 4/2000 | Stern et al. | |
| 6,082,816 | A | | 7/2000 | Gottlieb et al. | |
| 6,161,896 | A | | 12/2000 | Johnson et al. | |
| 6,186,584 | B1 | | 2/2001 | Samuelson et al. | |
| 6,371,560 | B1 | | 4/2002 | Fulford et al. | |
| 6,375,399 | B1 | | 4/2002 | Sitzler et al. | |
| 6,464,291 | B2 | * | 10/2002 | Hynds et al. | 296/213 |
| 6,540,279 | B1 | | 4/2003 | Bargiel | |
| 6,578,854 | B2 | * | 6/2003 | Wucherpfennig et al. | 180/330 |
| 6,702,370 | B2 | | 3/2004 | Shugar et al. | |
| D497,872 | S | | 11/2004 | Bonner et al. | |
| 6,883,846 | B2 | * | 4/2005 | Cheek et al. | 296/1.02 |
| 6,905,159 | B1 | | 6/2005 | Saito et al. | |
| 6,981,730 | B2 | | 1/2006 | Bixby | |
| 7,147,281 | B2 | | 12/2006 | Michisaka et al. | |
| D568,228 | S | * | 5/2008 | Geisler | D12/401 |
| 7,585,010 | B2 | * | 9/2009 | Hardy et al. | 296/37.16 |
| 7,815,209 | B2 | * | 10/2010 | Porcheron | 280/304.1 |

(Continued)

FOREIGN PATENT DOCUMENTS

| JP | 2007229153 A | 9/2007 |
|---|---|---|
| RU | 002090424 | 9/1997 |

*Primary Examiner* — Faye M. Fleming

(74) *Attorney, Agent, or Firm* — Faegre Baker Daniels LLP

(57) ABSTRACT

A utility vehicle is disclosed that may be used in multiple modes of use, such as a low speed transport vehicle or a golf cart. The vehicle has a rear passenger seat area which can be converted into a golf bag carrying mechanism. The vehicle also has a foot pedestal for use when operating with rear passengers, and which may fold up when not in use.

38 Claims, 24 Drawing Sheets

U.S. PATENT DOCUMENTS

| | | | |
|---|---|---|---|
| 2004/0031639 A1* | 2/2004 | Deves et al. | 180/311 |
| 2006/0163917 A1 | 7/2006 | Schroeder et al. | |
| 2007/0057526 A1 | 3/2007 | Bigelow et al. | |
| 2008/0211270 A1 | 9/2008 | Hu et al. | |

* cited by examiner

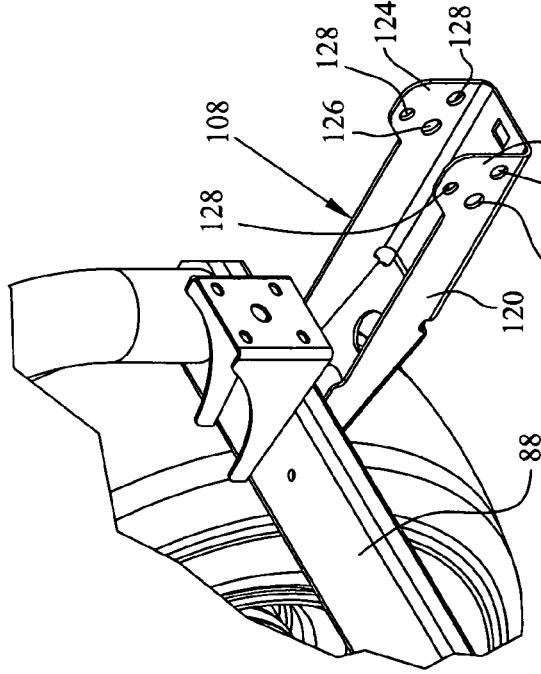
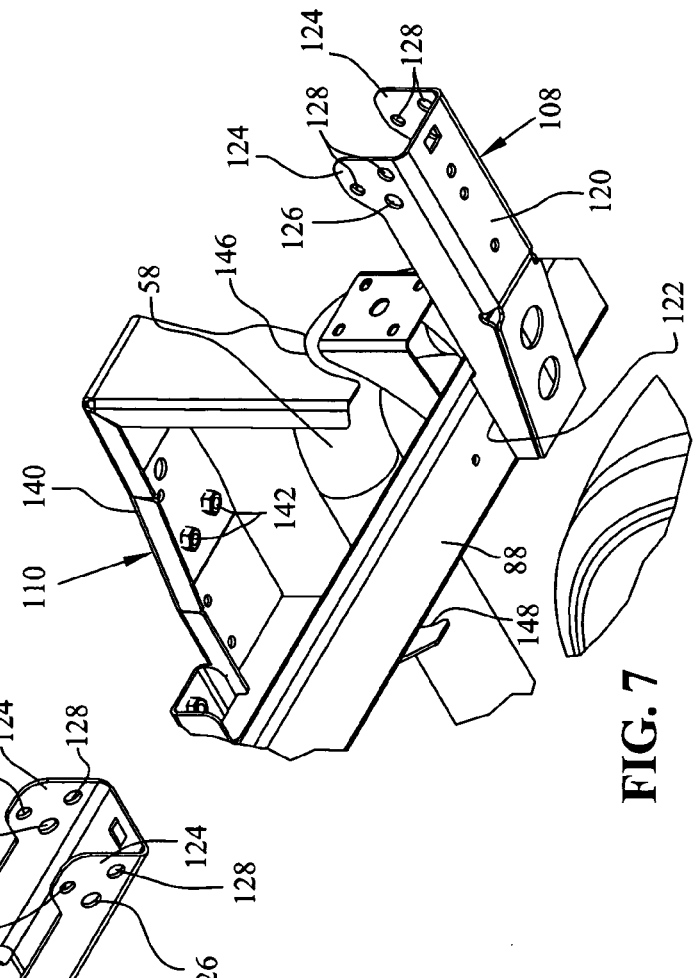
FIG. 6
FIG. 7

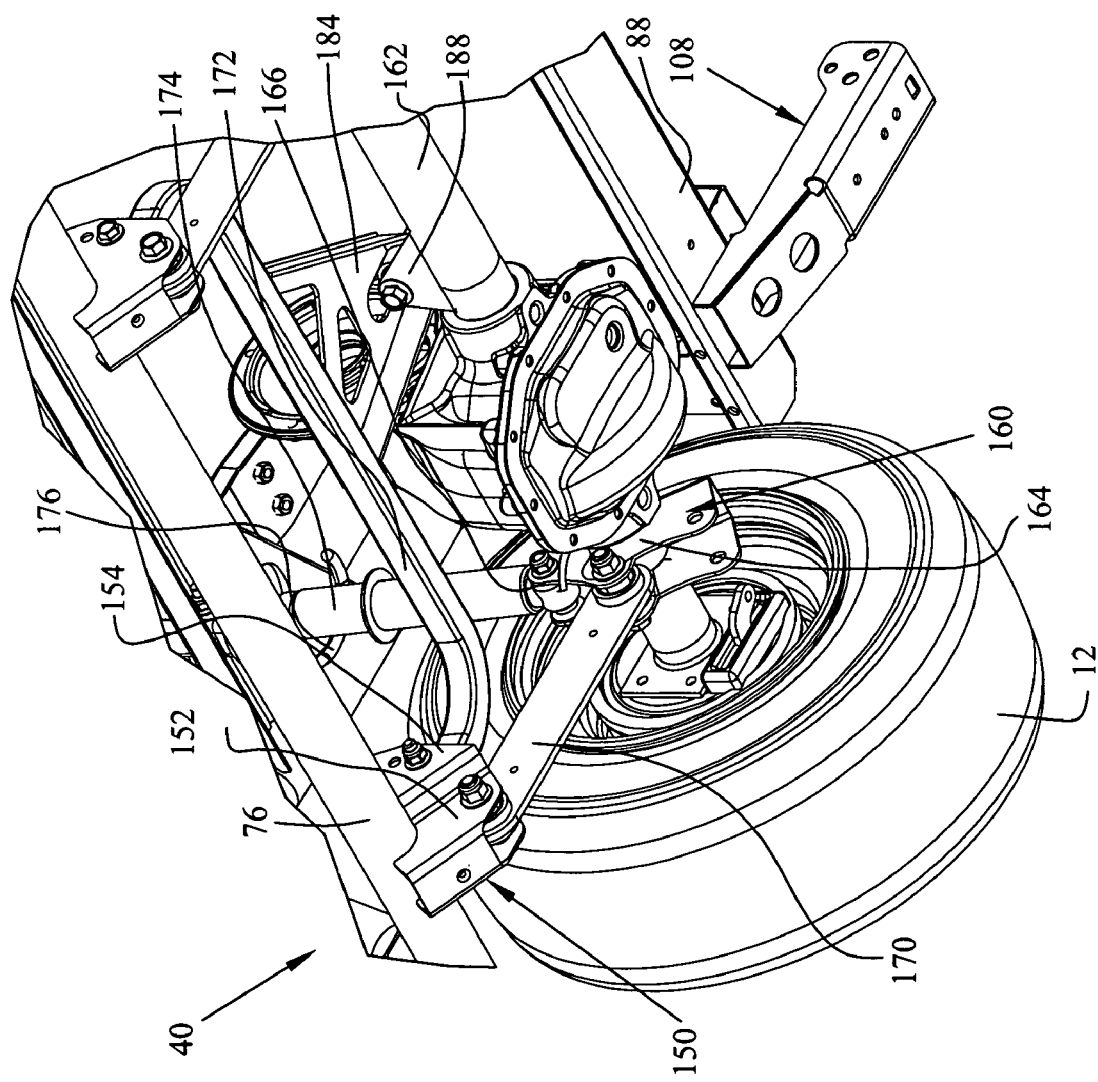

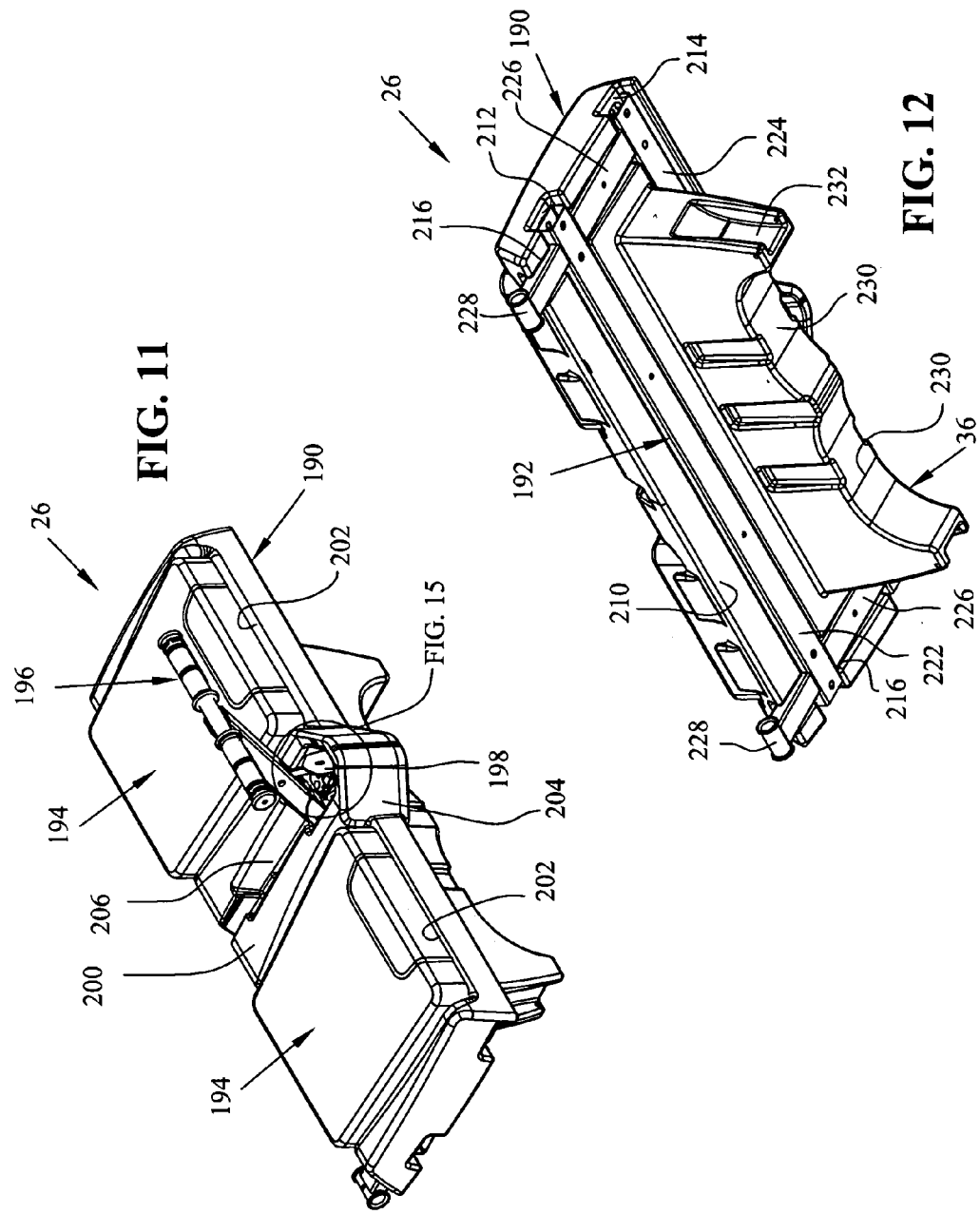

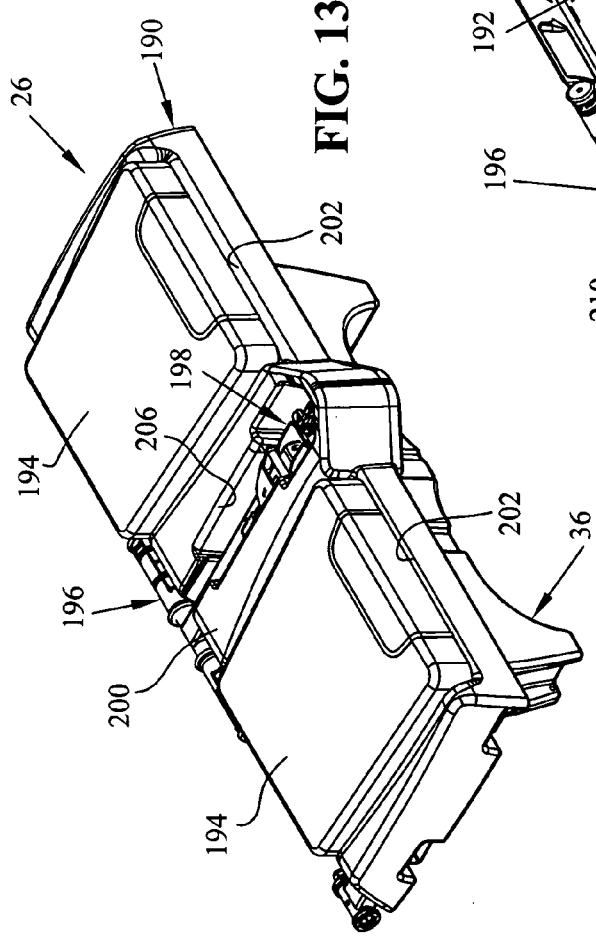
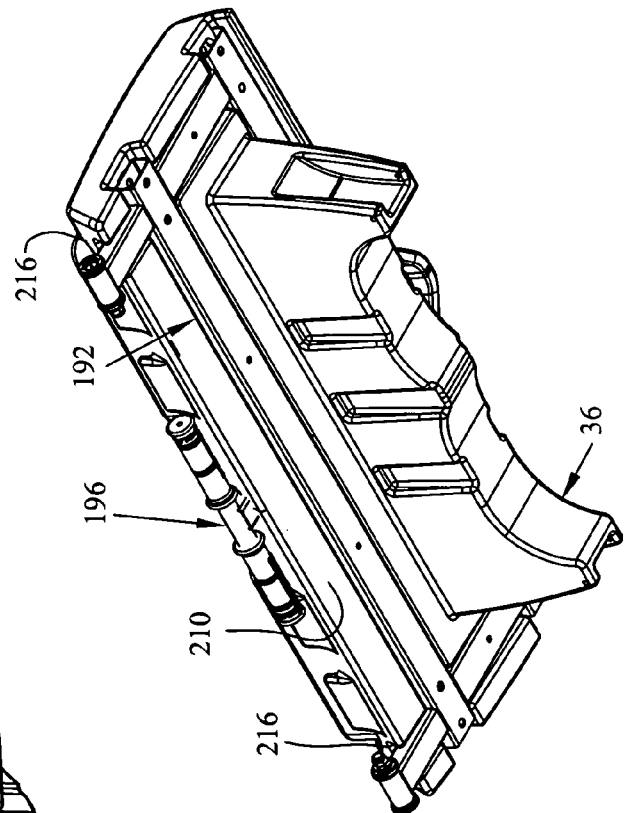

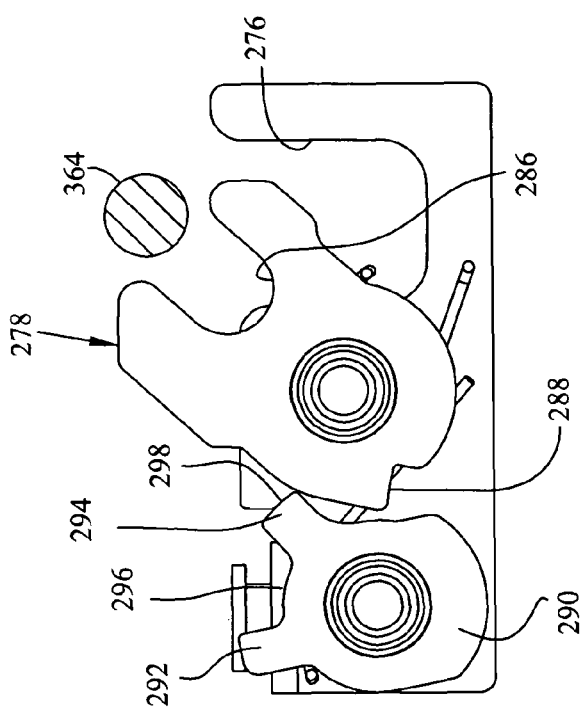
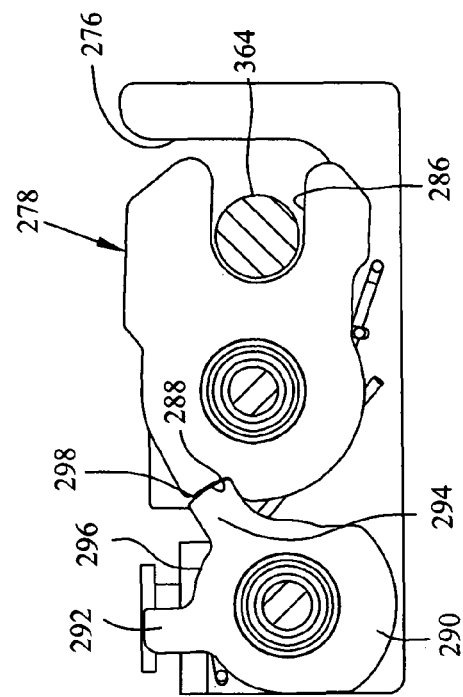
FIG. 18
FIG. 19

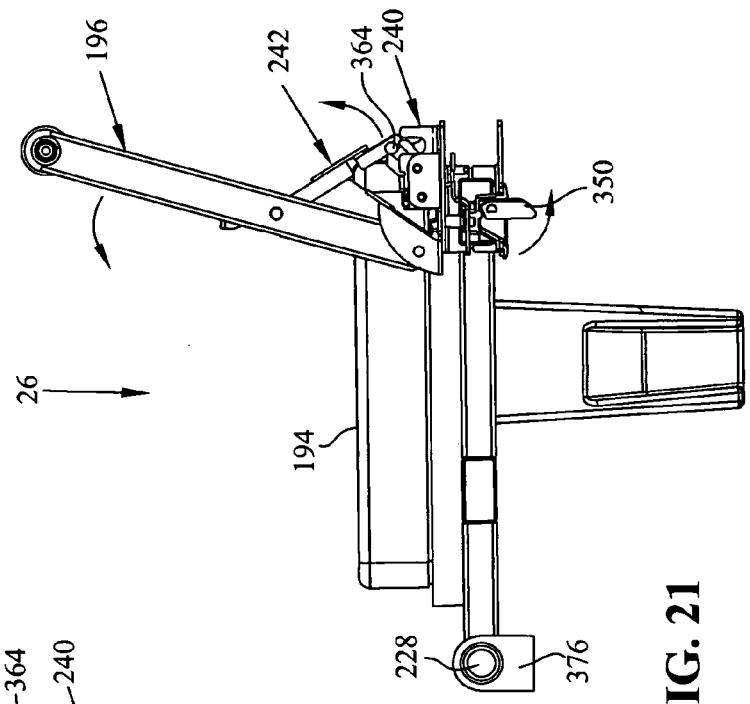
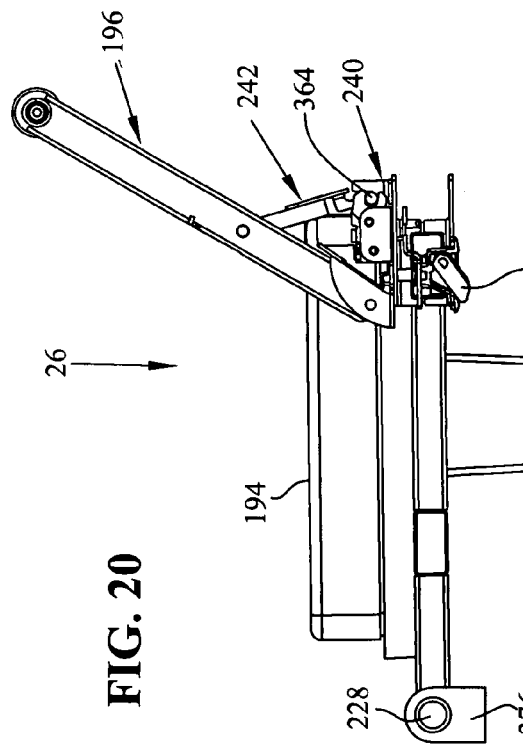

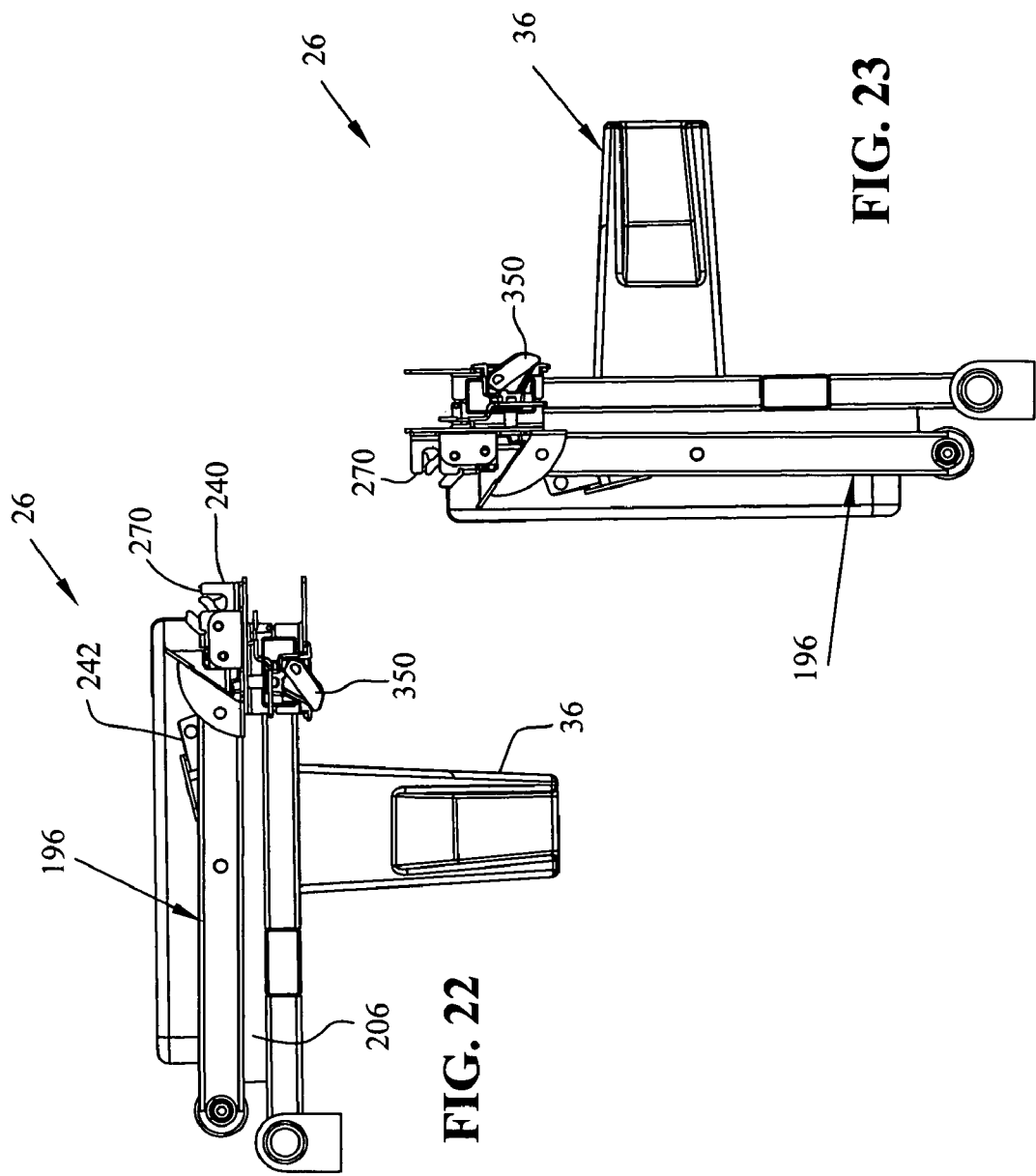

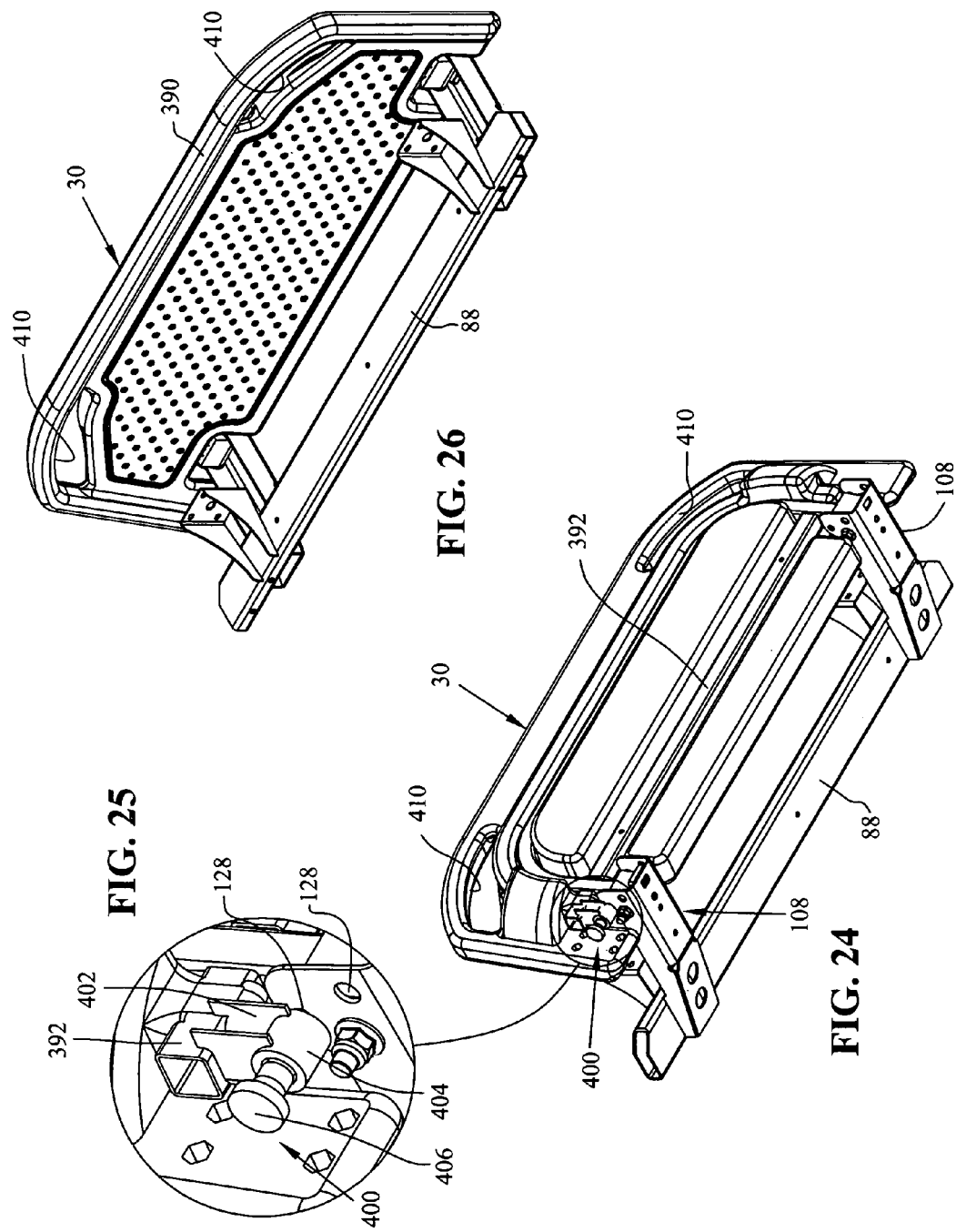

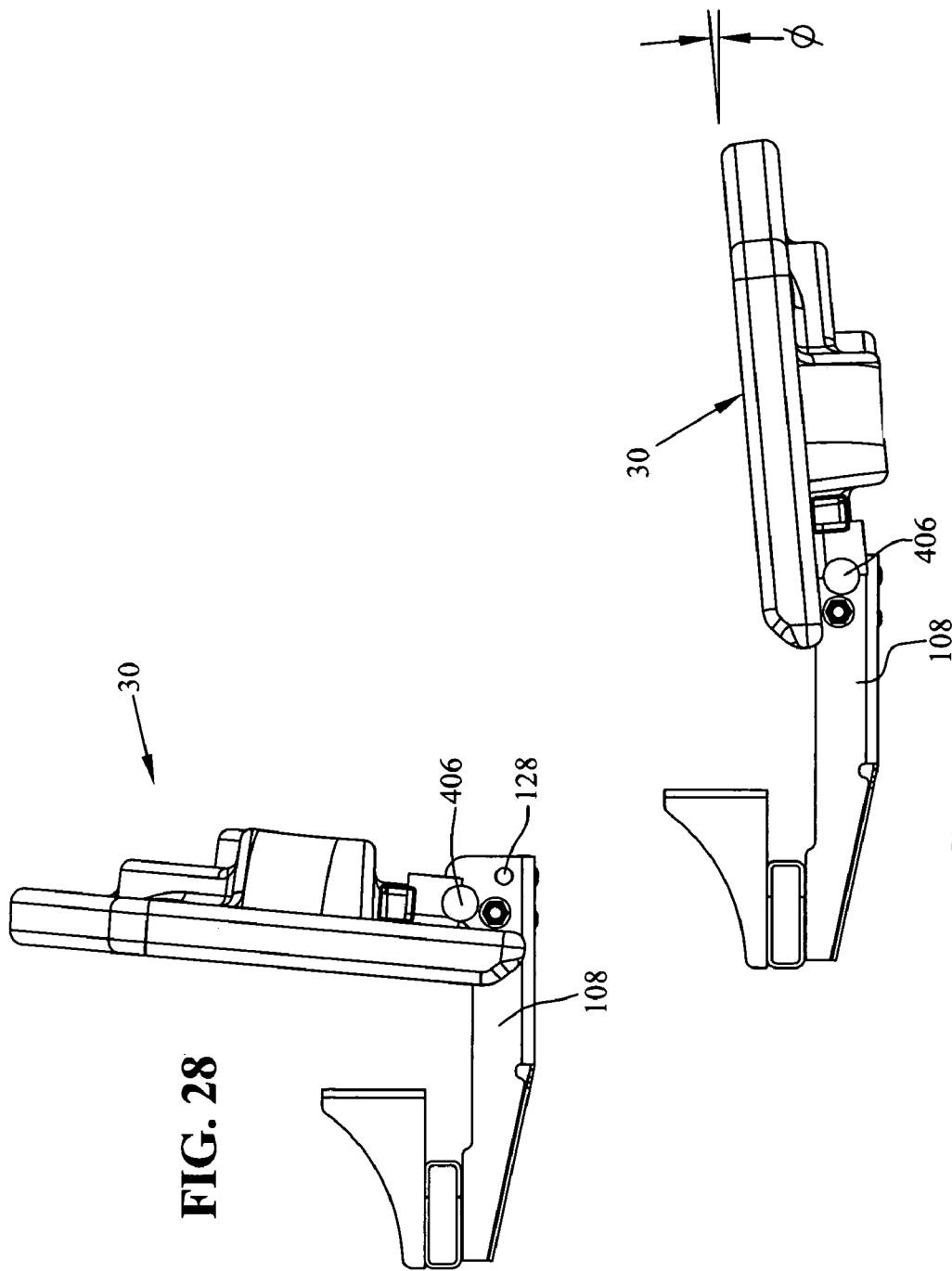

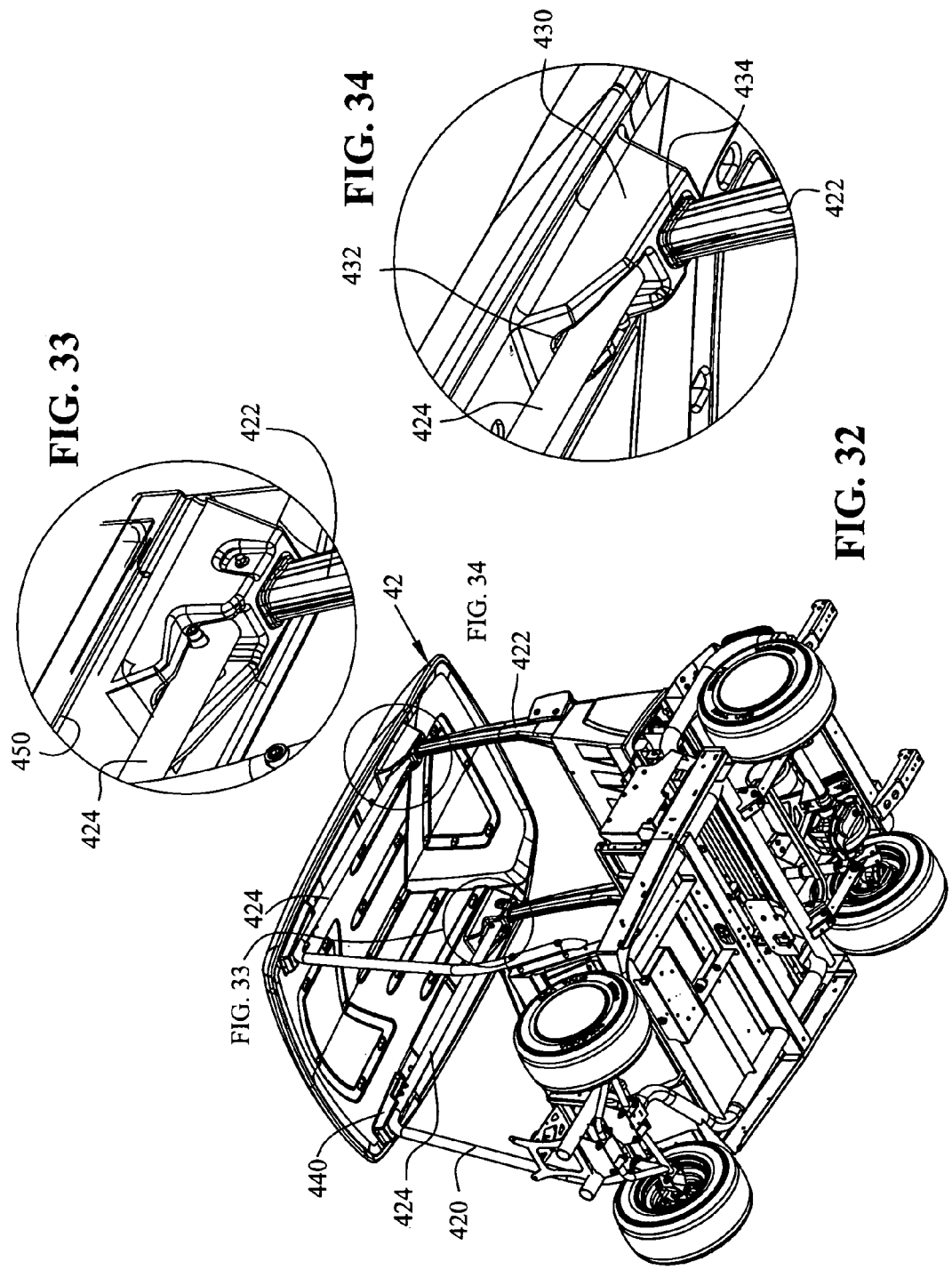

ent application publication number 20070057526, the disclosure of which is incorporated herein by reference. It would be advantageous to improve the functionality of this vehicle.

LOW SPEED VEHICLE

This application claims priority from U.S. Provisional application 61/158,160 filed Mar. 6, 2009, the subject matter of which is incorporated herein by reference.

BACKGROUND AND SUMMARY

The present disclosure relates to utility vehicles or low speed vehicles with multiples modes of use.

The statements in this section merely provide background information related to the present disclosure and may not constitute prior art.

Vehicle users continue to demand increased utility and functionality for utility vehicles. To this end, these users demand increased flexibility for storage and seating in utility-type vehicles. Increasing the flexibility and functionality of a utility vehicle allows the utility vehicles to be utilized more often and to perform additional tasks. Thus, increasing the functionality of a utility vehicle can increase its usefulness and its utilization. Accordingly, it would be advantageous to provide a utility vehicle that can have its functionality altered to perform different tasks.

It would be further advantageous if the switching of the functionality of the utility vehicles were able to be accomplished quickly and easily. Moreover, it would be advantageous if no special tools or any tools at all were necessary to change the functionality of the utility vehicle. Thus, it would be advantageous to provide a utility vehicle having a functionality that can be easily and quickly changed and the changing operation can be performed without the use of tools.

More particularly, it has become common in various communities, retirement communities and golf communities to have vehicles to transport people around a community. These vehicles could be similar to golf carts and can carry multiple persons. Some of the carts can be golf carts with rear facing seats. Others may be convertible between a utility vehicle and a golf cart, see for example U.S. Patent application publication number 20070057526, the disclosure of which is incorporated herein by reference. It would be advantageous to improve the functionality of this vehicle.

To satisfy this need, a low speed vehicle comprises a frame; a driver seat mounted to the frame; a rear facing side by side passenger seat mounted behind the driver seat, the rear facing passenger seat having a down position for use with passengers and an upright position for storage when no passengers. A rear wall is positioned intermediate the driver seat and the rear facing passenger seat. A security bar is positioned intermediate the side by side positions of the rear facing passenger seat, and the security bar has an upright position for use with passengers and a down position for use with no passengers. A latching assembly has a first latch mechanism located on the rear facing passenger seat proximate the security bar, a second latch mechanism on the security bar, and a third latch mechanism positioned on the rear wall, wherein when the rear facing passenger seat is down, the first latch mechanism is latched to the second latch mechanism to hold the security bar up, and when the rear facing passenger seat is folded up, the first latch mechanism is unlatched from the second latching mechanism, and the first latch mechanism is latched to the third latching mechanism.

In another aspect, a low speed vehicle comprises a frame; a driver seat mounted to the frame; a rear facing side by side passenger seat mounted behind the driver seat, where the rear facing passenger seat has a down position for use with passengers and an upright position for storage when no passengers. A rear wall is positioned intermediate the driver seat and the rear facing passenger seat and a security bar is positioned intermediate the side by side positions of the rear facing passenger seat. The security bar has an upright position for use with passengers and a down position for use with no passengers, wherein when in the down position, the security bar may be folded up with the passenger seat.

In yet another aspect, a low speed vehicle, comprises a frame; rear vehicle operational lights mounted to the frame; a driver seat mounted to the frame; a rear facing passenger seat mounted behind the driver seat; and a foot pedestal attached to the frame. The foot pedestal has a first position for use with rear facing passengers, and an upright position for use with no passengers, the foot pedestal has an operating position angled towards the vehicle at an angle of between 5° and 10° elevated from horizontal to allow the passengers feet to be angled up relative to the ground.

In yet another aspect, a low speed vehicle, comprises a frame; rear vehicle operational lights mounted to the frame; a driver seat mounted to the frame; a rear facing passenger seat mounted behind the driver seat; and a foot pedestal attached to the frame. The foot pedestal has a first position for use with rear facing passengers, and an upright position for use with no passengers. The foot pedestal has openings therethrough at locations proximate the rear vehicle operational lights, to view the rear vehicle operational lights from a rear thereof when the foot pedestal is in the upright position.

In yet another aspect, a low speed vehicle, comprises a frame; a driver seat, comprising a seat bottom and a seat back; front pillars mounted to the frame forward of the driver seat on left and right hand sides of the vehicle; rear pillars mounted to the frame rearward of the driver seat on left and right hand sides of the vehicle; a longitudinal frame member extending between each of the front and rear pillars; and a canopy operatively connected to the front and rear pillars. The canopy is spaced from at least a part of the longitudinal frame member to allow the driver and or passenger to use the longitudinal frame members as hand holds.

In another aspect, a low speed vehicle, comprises a frame; a driver seat mounted to the frame; a rear facing passenger seat mounted behind the driver seat; and a foot pedestal attached to the frame. The foot pedestal has a first position for use with rear facing passengers, and an upright position for use with no passengers, the foot pedestal being operational as a rear bumper in either the upright or down position.

In yet another embodiment, a low speed vehicle comprises a frame; a driver seat mounted to the frame; a drivetrain; fixed brackets mounted to opposite side of the frame; and an axle, having axle brackets attached thereto, in general lateral alignment with the fixed brackets. Trailing links extend between the fixed brackets and the axle brackets, and a linear force elements extend between the axle and the frame. A cross link extending between and movably attached to the fixed brackets and the axle.

Finally, a low speed vehicle may comprise a frame; a driver seat, comprising a seat bottom and a seat back; a driver seat adjustment mechanism positioned intermediate the frame and the driver seat back, where the driver seat adjustment mechanism allows the seat back to move with vertical and horizontal components.

The present teachings are merely exemplary and variations to the teachings can be employed. For example, the utility vehicle can be in a configuration other than that of a golf car. Additionally, the various interchangeable accessories can be modified to correspond to the contour of the utility vehicle upon which the interchangeable accessories are to be utilized. Additionally, the latching and locking members and mechanisms can be altered to accommodate different engaging features on the utility vehicle. Thus, such variations are not to be regarded as a departure from the spirit and scope of the present teachings.

BRIEF DESCRIPTION OF THE DRAWINGS

FIG. 6 is an enlarged view of the portion identified in FIG. 3;

FIG. 7 is an enlarged view of the portion identified in FIG. 4;

FIGS. 8A and 8B are enlarged fragmentary views of the rear suspension from opposite perspectives;

FIGS. 9-12 show various perspective views of the seat bottom assembly for passenger rear facing seat, showing the security bar in the upright position;

FIGS. 13 and 14 show upper and lower perspective views of the rear facing passenger seat assembly with the security bar in the down position;

FIG. 18 is a cross-sectional view through lines 18-18 of FIG. 17;

FIG. 19 is a cross-sectional view similar to that of FIG. 18 showing the latch in the locked position;

FIGS. 20-23 show diagrammatical views of the passenger seat assembly changing between the four passenger mode and the golf cart mode;

FIG. 24 shows a rear perspective view of the rear foot pedestal assembly;

FIG. 25 shows an enlarged view of the portion identified in FIG. 24;

FIG. 26 shows an alternate perspective view of the foot pedestal of FIG. 24;

FIGS. 27 and 28 show side plan views of the foot pedestal of FIG. 24 in the down and up positions, respectively;

FIG. 32 is an underside perspective view of the vehicle as shown in FIG. 31;

FIG. 33 is an enlarged view showing the portion identified in FIG. 32;

FIG. 34 is an enlarged view of the portion identified in FIG. 32;

DETAILED DESCRIPTION OF THE EMBODIMENTS

Figure 1:
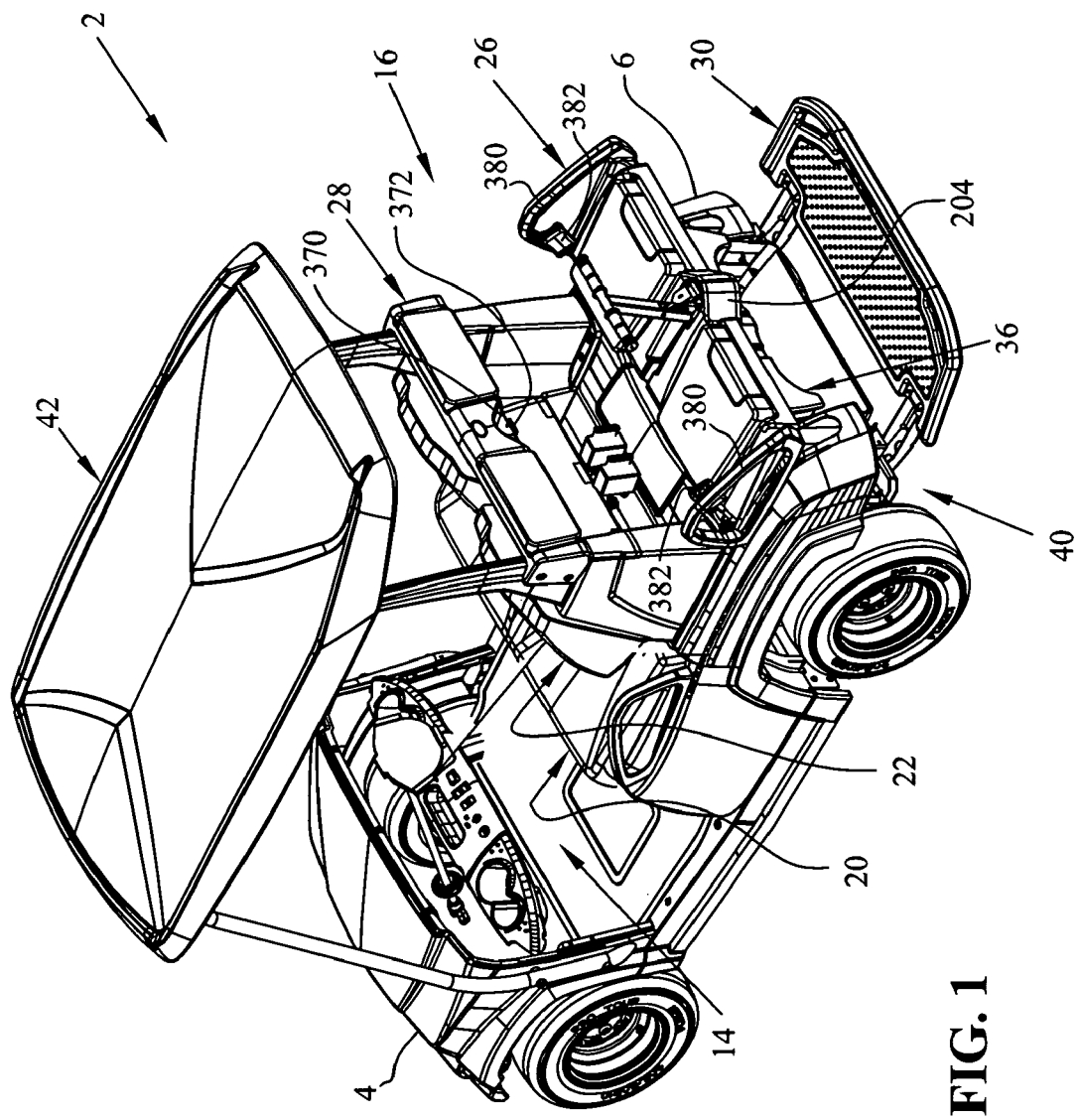
FIG. 1 is a rear perspective view of the low speed vehicle showing the rear passenger area in an operational mode.
Figure 2:
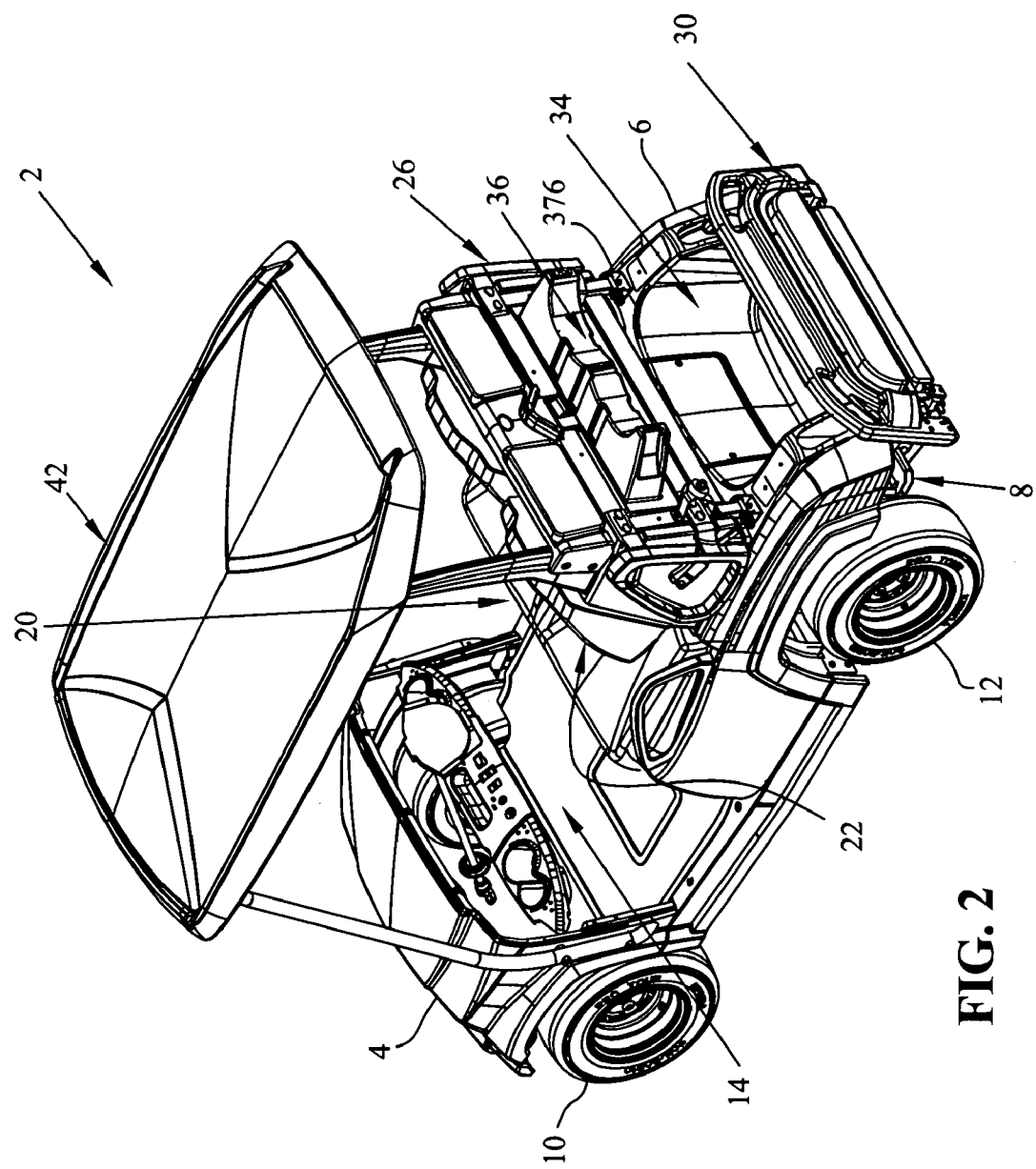
FIG. 2 is a rear perspective view similar to that of FIG. 1, showing the rear passenger area modified for use as a golf cart.

With reference first to FIGS. 1 and 2, the low speed vehicle 2 is shown in two different two modes; FIG. 1 shows a first mode where the vehicle may be used to transport four persons, and FIG. 2 shows the vehicle in a golf cart mode. The vehicle 2 is shown generally including a front end 4, a rear end 6, and a frame 8 (FIG. 2) supported by front wheels 10 and rear wheels 12. The vehicle has a driver and front passenger area 14 and a rear passenger area 16. The driver and front passenger area 14 is comprised of a seat bottom assembly 20 and a seat back assembly 22. The rear passenger area 16 is comprised of a seat bottom assembly 26 and a seat back assembly 28. The rear passenger area 16 also includes a rear foot pedestal 30 for providing a foot support for the rear facing passengers when in the four person vehicular mode as shown in FIG. 1. The vehicle 2 also shows a storage area 34 for receiving the lower portion of 2 golf bags and an upper support 36 for holding the golf bags in an upright position as described further herein. Finally, a rear suspension assembly 40 (FIG. 1) and a top canopy assembly 42 is described herein.

Figure 3:
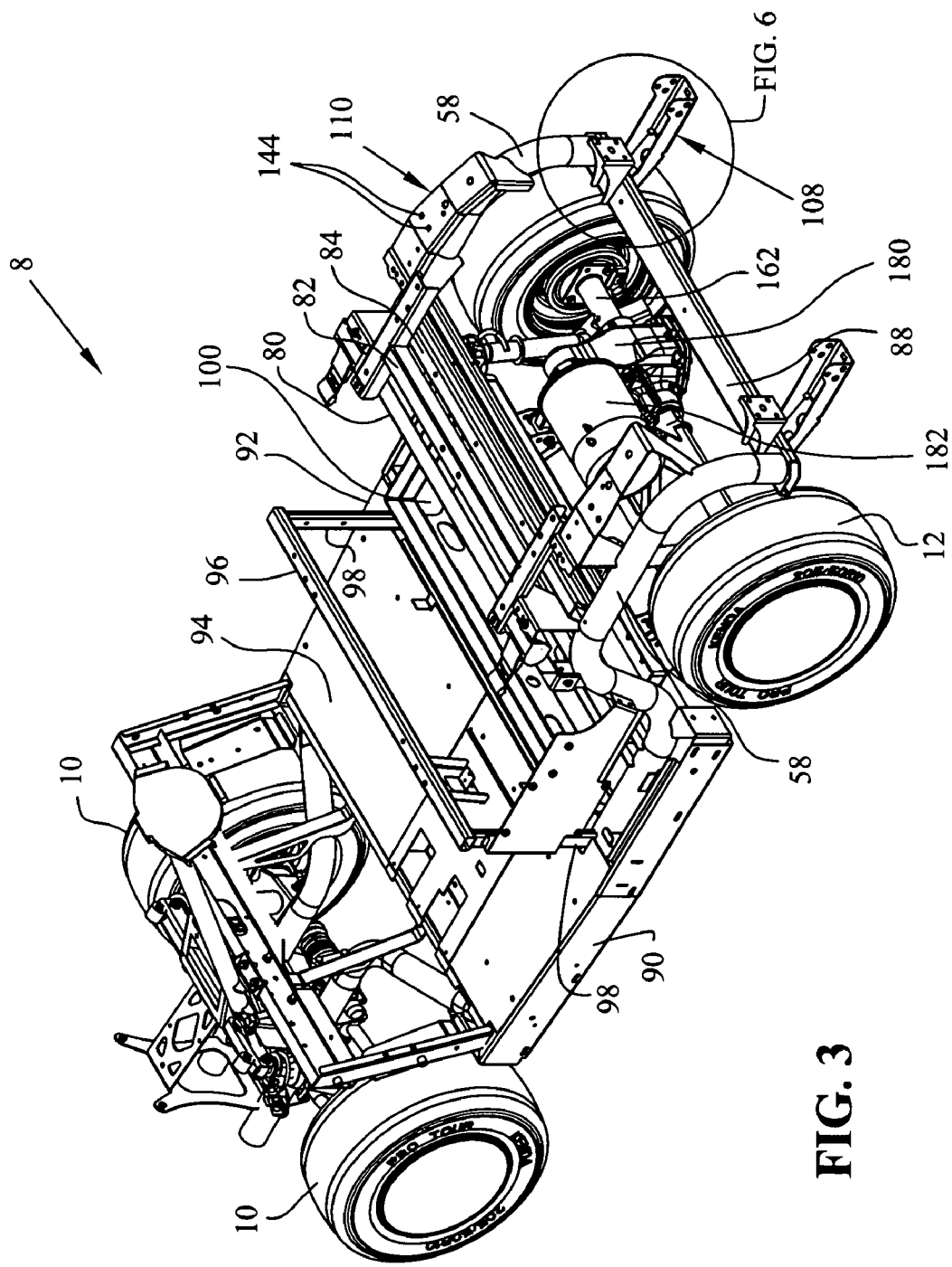
FIG. 3 is a rear perspective view of the low speed vehicle frame and drivetrain.
Figure 4:
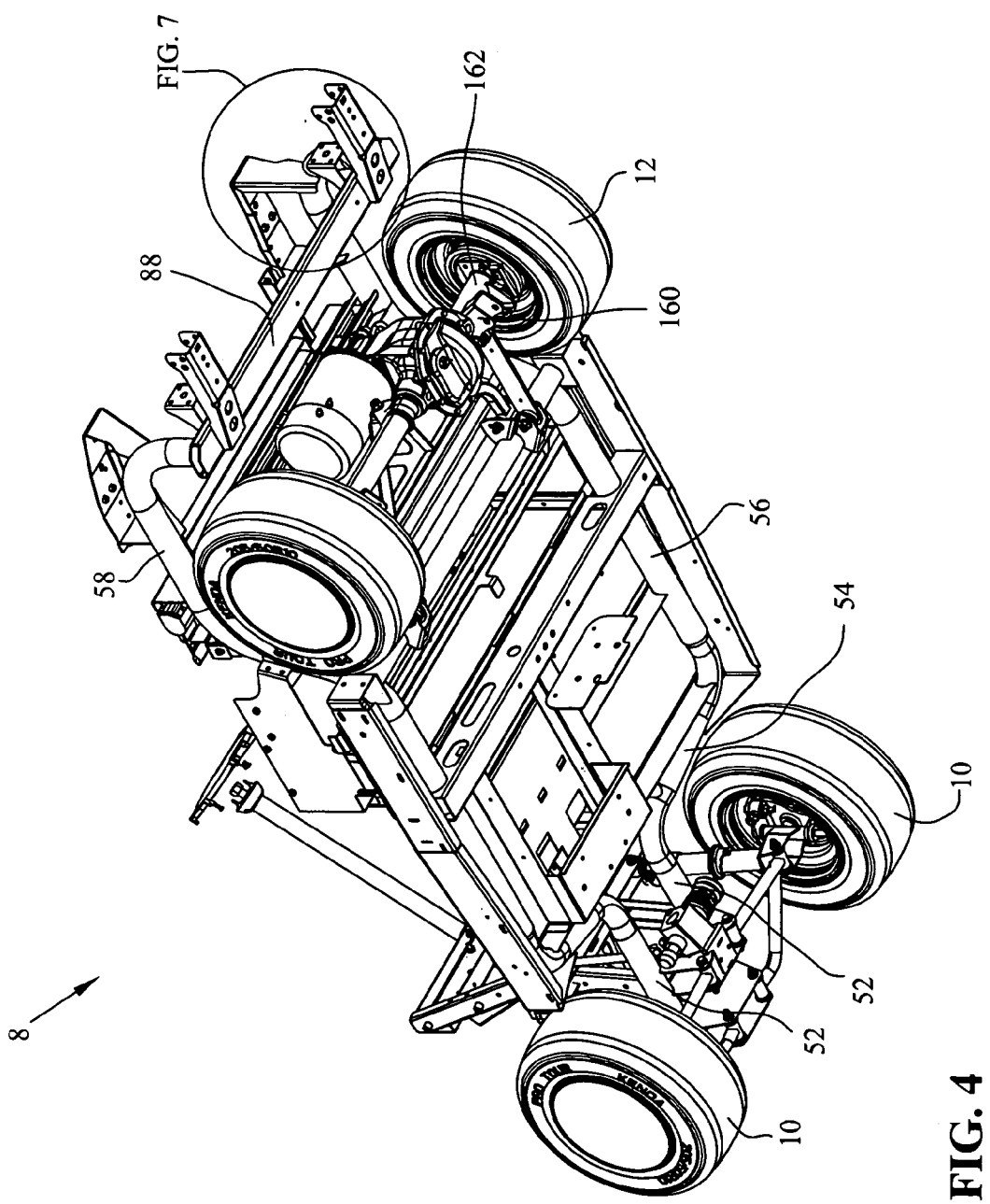
FIG. 4 is a view similar to that of FIG. 3 showing an underside perspective view.
Figure 5:
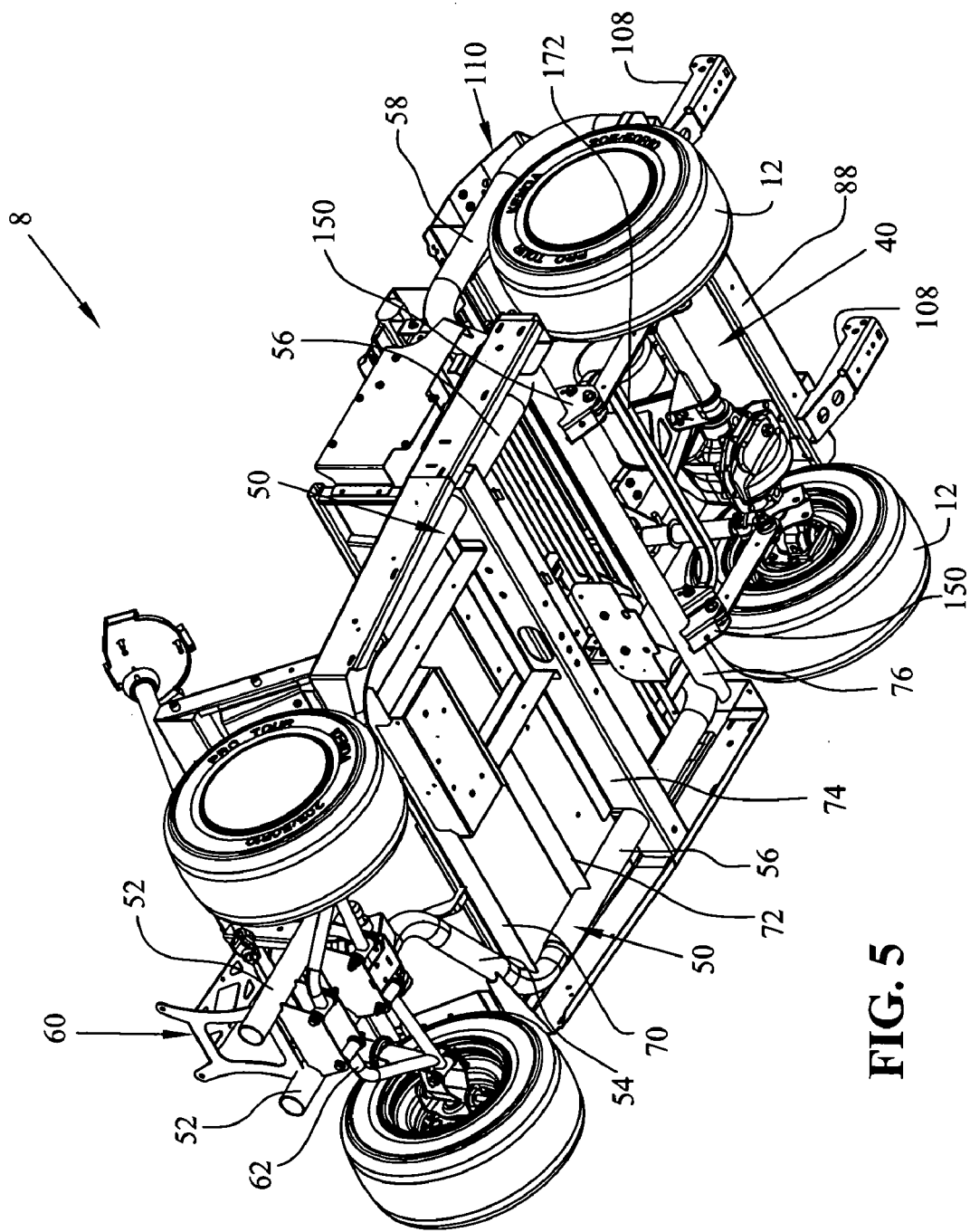
FIG. 5 is similar to that of FIG. 4 showing a frontal underside perspective view.

With respect now to FIGS. 3-5, frame 8 will be described in greater detail. As shown best in FIG. 5, a backbone of frame 8 includes two generally longitudinally extending tubular frame members 50 having front sections 52, angled sections 54, longitudinally extending sections 56 and upright portions 58 which extend upwardly and over rear wheels 12. A front end section 60 spans the two front frame portions 52 and contains a front suspension assembly 62. The longitudinally extending frame sections 56 include transverse frame members such as 70, 72, 74 and 76 (FIG. 5). Meanwhile cross-frame members such as 80, 82 and 84 (FIG. 3) connect to upright frame portions 58, and a rear frame portion 88 connects the free ends of the upright portions 58. As best shown in FIG. 3, frame 8 further includes side supports 90 and 92, floor 94 and a crossbar 96 held by uprights 98 to assist in holding the front seat bottom. A battery box 100 is positioned intermediate crossbars 80 and 96 for retaining batteries for the electric vehicle. Finally frame 8 includes a foot pedestal support 108 and a rear seat support 110 as described below.

With reference now to FIGS. 6 and 7, pedestal support 108 is generally comprised of a channel member 120 attached to rear crossbar 88 and connected at a seam 122, for example, by welding. Channel 120 includes flanges 124 having mounting holes 126 and locating holes 128 as described herein.

With respect still to FIG. 7, upper support member 110 is shown defining an upper support surface 140 where threaded nuts 142 are positioned on the opposite side of apertures 144 (see FIG. 3) for receiving fasteners such as bolts therethrough as described herein. Upper support member 110 is attached to uprights 58, for example, at seams 146 and 148 such as by welding.

With respect now to FIGS. 8A and 8B, rear suspension 40 will be described in greater detail. As shown, suspension system 40 includes a fixed bracket 150 having a first and second attachment portions 152, 154. Suspension system 40 also comprises a moveable axle bracket portion 160 attached to rear axle 162 and is moveable with the axle 162. Axle bracket 160 includes a first attachment portion 164 and a second attachment portion 166. As shown, a trailing link 170 extends between the first attachment portion 152 of the fixed bracket 150 and the first attachment portion 164 of the axle bracket 160. It should be appreciated that brackets 150 and 160 are fixedly mounted to the frame and axle respectively, for example by welding. Meanwhile a generally U-shaped cross link 172 extends between the second attachment portions 154 of the two fixed bracket portions 150 as best shown in FIG. 5. A linear force element such as a shock absorber 174 is attached at its lower end to second attachment portion 166 of bracket 160 and to an underside of crossbar 82 (FIG. 3). A coil spring 176 may be used to circumscribe shock absorber 174 as is known in the art. As best shown in FIG. 3, axle 162 supports transmission 180 which in turn is connected to electric motor 182.

Figure 8B:
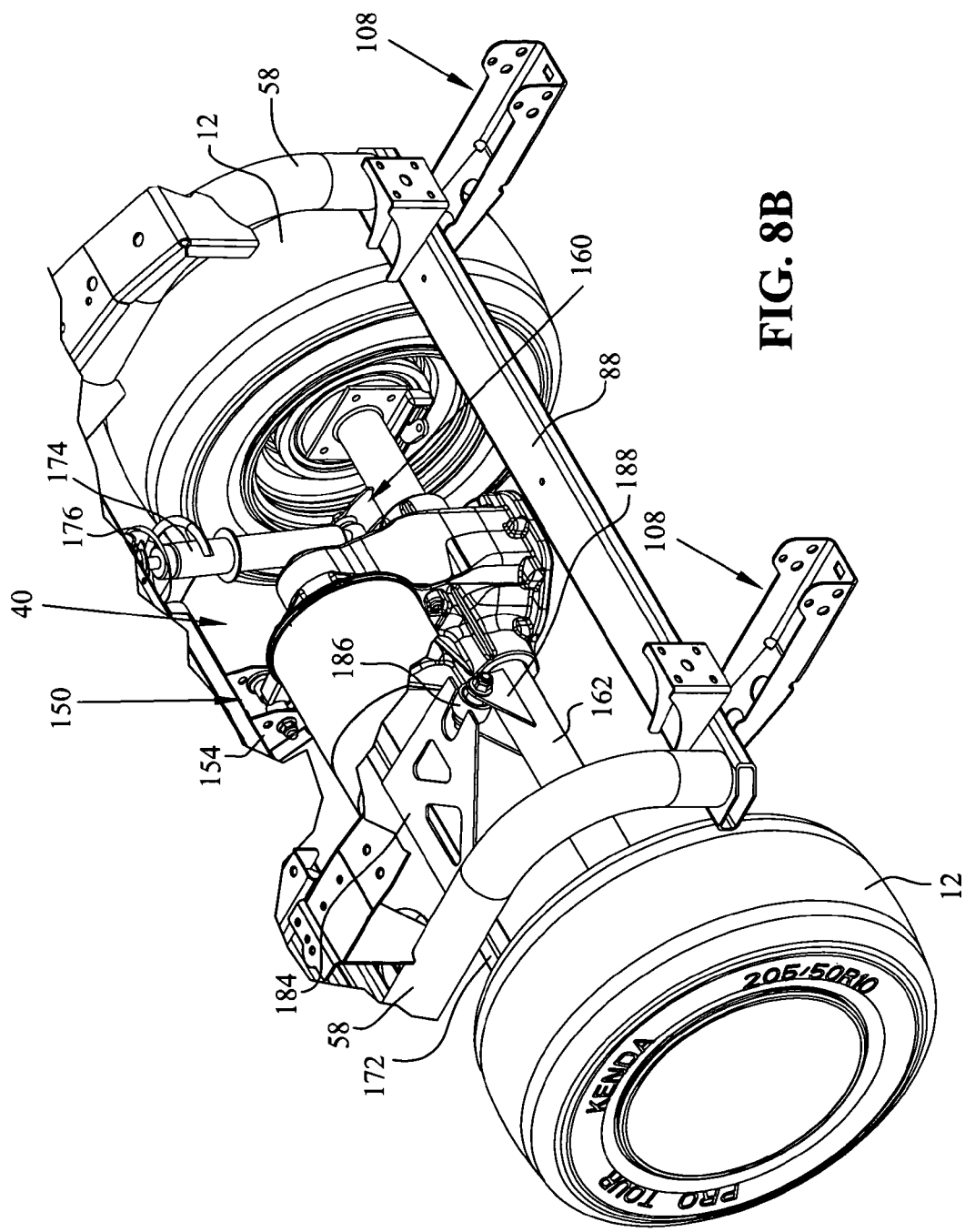

As best shown in FIG. 8B, the suspension system further comprises a triangular link 184 which is attached to cross link 172 at one end, and to a bushing 186 at the opposite end. Bushing 186 is thereafter attached to axle 162 by way of bracket 188. As should be appreciated, bushings 186 may rotate about a longitudinal axis.

Thus as shown, electric motor 182 drives transmission 180, which then drives rear wheels 12 through transmission 180, and the drivetrain comprised of motor 182 and transmission 180 is supported by the shock absorber 174 through trailing arm 170. Cross link 172 is a triangulated link in that it is attached at 154 on both sides and at center bracket 188. Cross link 172 controls the fore and aft motion of the axle as well as the side to side motion of the axle. The suspension system thus allows the wheels and tires to move vertically through the combination trailing arm 170/shock 174, as well as through the rotation of cross link 172. However, the axle/frame combination is provided with lateral stability through the cross link 172 attachment to the axle. Said differently, the suspension prevents lateral swaying of the frame and chassis relative to the axle, when the axle needs to move vertically, particularly when only one wheel moves vertically.

Figure 9:
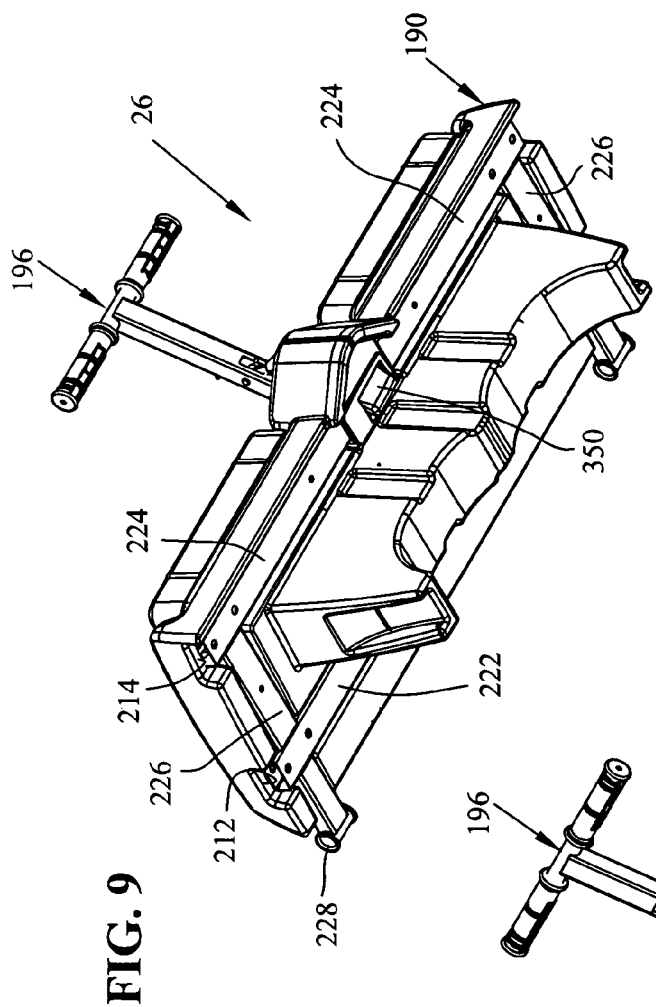
Figure 10:
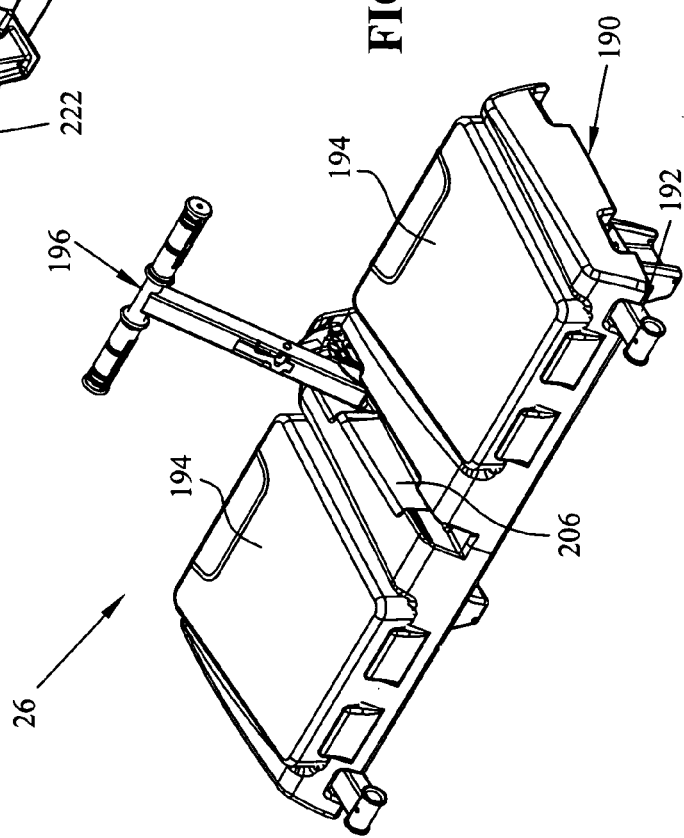

With reference now to FIGS. 9-12, the rear seat bottom assembly 26 will be described in greater detail. As shown best in FIG. 12, seat bottom assembly 26 generally comprises a base 190, a frame 192, cushions 194 (FIG. 11), a security bar 196 having a latch assembly 198. As shown in FIGS. 10 and 11, base 190 includes an upper surface 200 having defined impressions 202 to receive the cushions 194. Base 190 also includes a contoured front wall section 204 which receives latch assembly 198 therein. Finally base portion 190 includes a slot 206 therein to receive the security bar 196 when in the down position as shown of FIG. 13, as described herein.

With respect now to FIGS. 12 and 14, base 190 further comprises a lower surface 210 having laterally extending slots 212, 214 and longitudinally extending slots 216. Frame 192 is also comprised of laterally extending channels 222 and 224 positioned in respective slots 212, 214 and longitudinally extending frame channels 226 extending in longitudinally extending grooves 216. The ends of channels 226 includes hinges at 228 which fasten the seat bottom assembly to the vehicle as will be described herein.

As shown in either of FIG. 9 or 12, the golf bag upper support 36 is integrally connected to bottom surface 210 and is circumscribed by the frame channels 222, 224 and 226. It should be appreciated that the base portion 190 could be integrally molded from a plastic material by way of a blow-molded, roto-mold or other similar process. As best shown in FIG. 12, golf bag upper support 36 stands out from surface 210 to define two contoured surfaces 230 for the receipt of side-by-side golf bags, and includes an integrally molded recess at 232 to receive strap holders as is known in the art.

Figure 15:
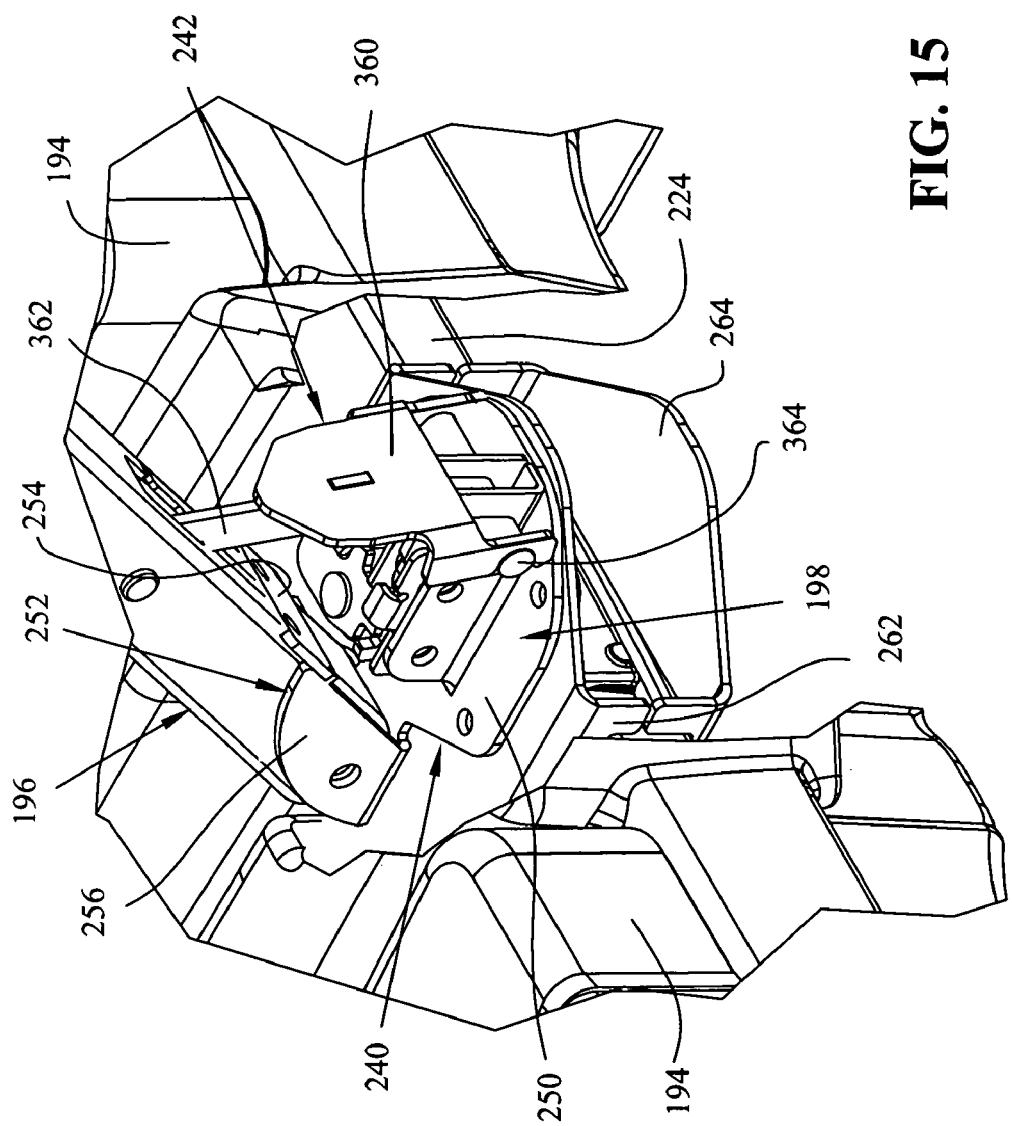
FIG. 15 shows an enlarged view of the portion identified in FIG. 11.
Figure 16:
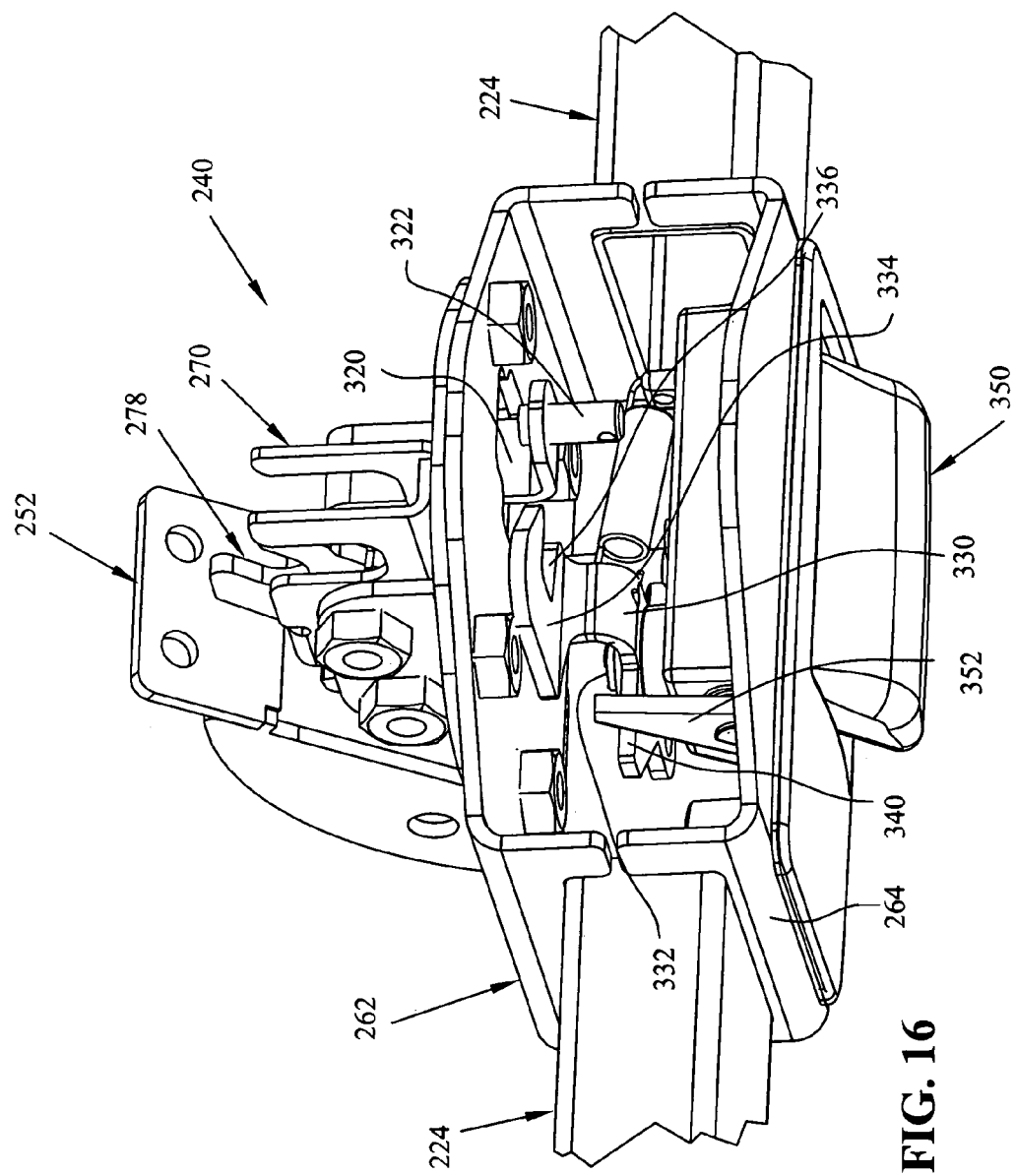
FIG. 16 shows an enlarged view of the latch of FIG. 15.

With respect now to FIG. 15, latch assembly 198 is defined by a latch structure 240 which is attached to frame channels 224 and a latching second portion 242 which is attached to the security bar 196. As shown in FIG. 15, latching member 242 is latched to latching member 240 which retains the security bar in its upright position. With reference now to FIGS. 15 and 16, latch member 240 will be described in greater detail.

Latch 240 includes a plate member 250 having an integrated stop member 252 having an end stop wall 254 and stop walls 256. As shown in the position of FIG. 15, security bar 196 is positioned against the end stop wall 254 and between side walls 256 in the latched position. Plate member 250 is attached to an upper latch frame member 262 which together with lower latch plate 264 retains the latch to channels 224. It should be appreciated that frame members 262 and 264 may be attached to channel members 224 by any means known such as welding or adhesives or fasteners, and the like.

Figure 17:
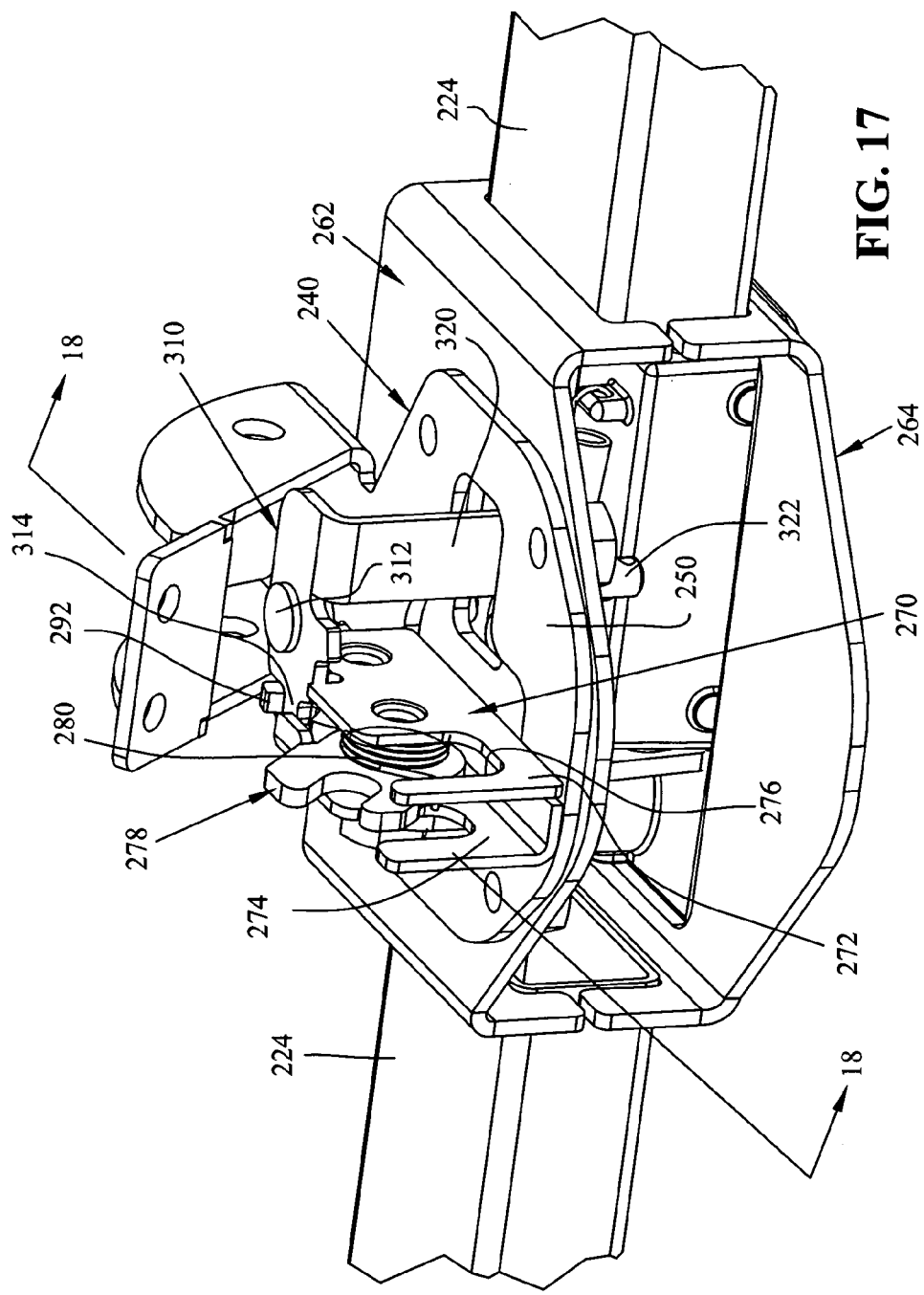
FIG. 17 is a view similar to that of FIG. 16 from a different perspective.

As shown best in FIGS. 16 and 17, latch 240 further includes a latching element 270 comprised of two upstanding plate members 272 and 274 which define a U-shaped channel at 276. A latching element 278 is positioned intermediate plates 272 and 274 and has a torsion spring 280 spring loading the latching element 278 into the open position shown in FIG. 17, that is, in the unlatched position. Latching element 278 is shown in greater detail in FIGS. 18 and 19 as including a latch receiving opening at 286 and a catch at 288. A rotatable catch 290 is shown being positioned approximate to latching element 278 and has two pawls 292 and 294 where pawls 292 and 294 define an opening 296 therebetween and where pawl 294 defines a contoured edge 298, all of which will be described herein. With respect again to FIGS. 16 and 17, latch 240 further includes an upper actuator at 310 which rotates about pin 312 and has a foot 314 which is positioned within openings 296 (FIG. 18) between pawls 292 and 294. Actuator 310 also includes an arm 320 which extends downwardly through plate 250 and through upper frame member 262 as shown in FIGS. 16 and 17. Arm 320 has a pin at 322 as best shown in FIG. 16. As also shown in FIG. 16, latch 240 further includes a lower actuator member 330 which rotates about pin 332. Lower actuator 330 includes a forward catch 334 having a catch opening at 336. Lower actuator 330 also includes a striker surface at 340, which when engaged pivots the actuator 330 about pin 332. Finally, as shown in FIG. 16, latch assembly 240 further includes a release handle 350 operatively connected to a release member 352 which when rotated engages striker surface 340.

With respect again to FIG. 15, latch portion 242 includes a spanner portion 360 attached to security bar 196 by way of a link arm 362 and includes a pin 364 for cooperation with latch member 240. With respect now to FIGS. 15-19, the cooperation of the latch assembly 198 will be described.

As mentioned before, the latch assembly 198 is shown in the locked position in FIG. 15 with the security bar 196 shown in the secured position against the stop 252, which corresponds to the position of security bar 196 as shown in FIG. 11. Thus when latch 350 is pulled forwardly as shown in FIG. 16, release member 352 engages striker surface 340 rotating lower actuator member 330. This disengages catch opening 336 from pin 322 rotating upper actuator 310 about pin 312. This causes rotation of member 290 (FIG. 18) in a counter-clockwise sense disengaging catch surfaces 288, 298. When moving in the opposite direction, and again with reference to FIGS. 18 and 19, as pin 364 is moved downwardly into the opening 286 as shown in 18, member 278 is rotated in a clockwise sense to the position where catch surfaces 288 and 298 are locked into the position of FIG. 19. In this position, counter-rotation of member 278 is prevent by the engagement of surfaces 288 and 298 until such time as the handle 350 is released as described above.

In terms of the cooperation of the operation of the latch member 240 in respect of the entire seat bottom assembly, reference is made to FIGS. 20-23. As shown in FIG. 20, security bar 196 is shown in the fully latched position with pin 364 latched in place in the position of FIG. 19. As shown in FIG. 21, handle 350 is shown rotated in a counterclockwise position, and pin 364 is released from latch 240, and is now in the position of FIG. 18. This allows latch member 242 to be lifted up and security bar 196 rotated in the counterclockwise position. FIG. 22 shows the security bar 196 rotated downwardly into the corresponding slot 206 (FIG. 13) whereas FIG. 23 shows the entire seat assembly rotated upwardly into the position shown in FIG. 2.

It should be noted from FIG. 1 that seat back assembly 28 includes a contoured wall 370 and further includes a counterpart latch 372. Thus as shown in FIG. 1, contoured surface 204 (FIG. 11) of seat bottom assembly 26 may be rotated into position where it is tucked under seat back assembly 28 such that the frame and contoured surface 204 fit below the seat back assembly 28 and contoured surface 370 respectively, and latch portion 240 cooperates with counterpart latch 372 to hold the seat bottom assembly 26 into the upright position of FIG. 2.

As shown in FIGS. 2 and 20, seat bottom assembly 26 includes hinges 376 which are positioned over and attached to apertures 144 and threaded apertures 142. Finally with respect to FIGS. 1 and 2, seat bottom assembly 26 further includes armrests 380 and seatbelt buckles 382 which are attached to seat assembly 26 and more particularly to frame 192, and both the armrests 380 and the seatbelt buckles 382 rotate together with the seat assembly and flank the vehicle as shown in FIG. 2.

With respect now to FIGS. 24-26, the rear foot pedestal 30 will be described in greater detail. As shown, rear foot pedestal 30 is comprised of an integral body portion 390 having a laterally extending frame member 392. Frame tube 392 retains a latch member 400 as best shown in FIG. 25. Latch member 400 includes plate members 402 holding a cylinder 404 which in turn holds a popper pin 406 having a pin positioned at an end thereof and spring loaded into one of the locating holes 128. It should be noted that the latch 400 is located on only one side thereof and therefore a user may grasp the body portion 390, pull the popper pin 406 and move the rear foot pedestal between the extreme positions shown in FIGS. 27 and 28. As shown in FIG. 27, when the rear foot pedestal 30 is in the fully down position, the pedestal provides a slight angle upwardly towards the rear passenger to provide a secure feeling when the passenger's feet are on the pedestal, where the angle φ is between 5-10° and more preferably about 7°.

Figure 30:
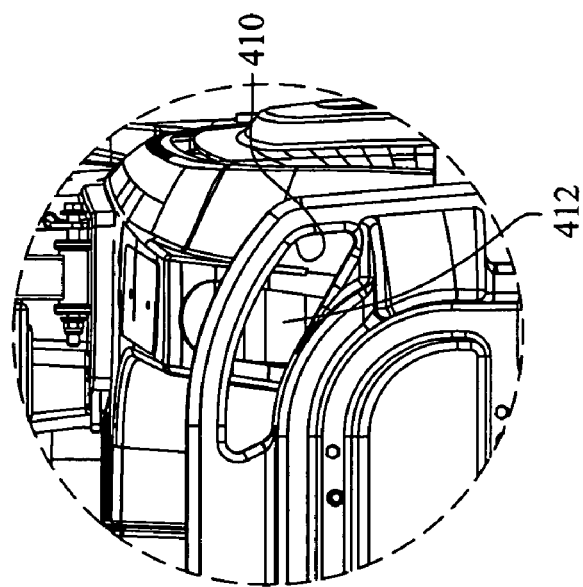
FIG. 30 shows an enlarged view of the portion identified in FIG. 29.
Figure 29:
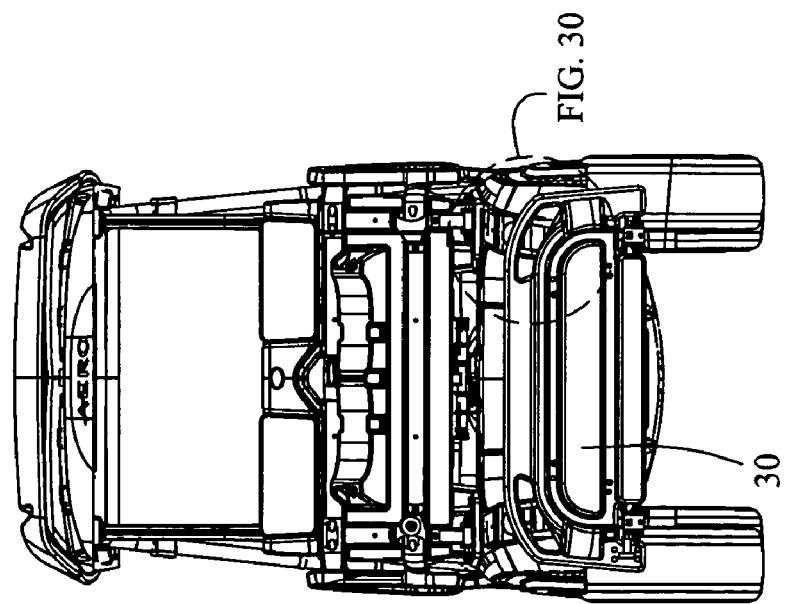
FIG. 29 is a rear plan view of the vehicle in the golf cart mode.

As also shown in FIGS. 24 and 26, the body portion 390 is integrally molded to include openings 410 at the corners thereof in order that the openings are positioned adjacent to rear directional signals of the vehicle. More particularly as shown in FIGS. 29-30, with the rear foot pedestal 30 in the upright position, openings 410 are located proximate to braking/directional signals 412 in order that the signals illuminate through openings 410.

Figure 31:
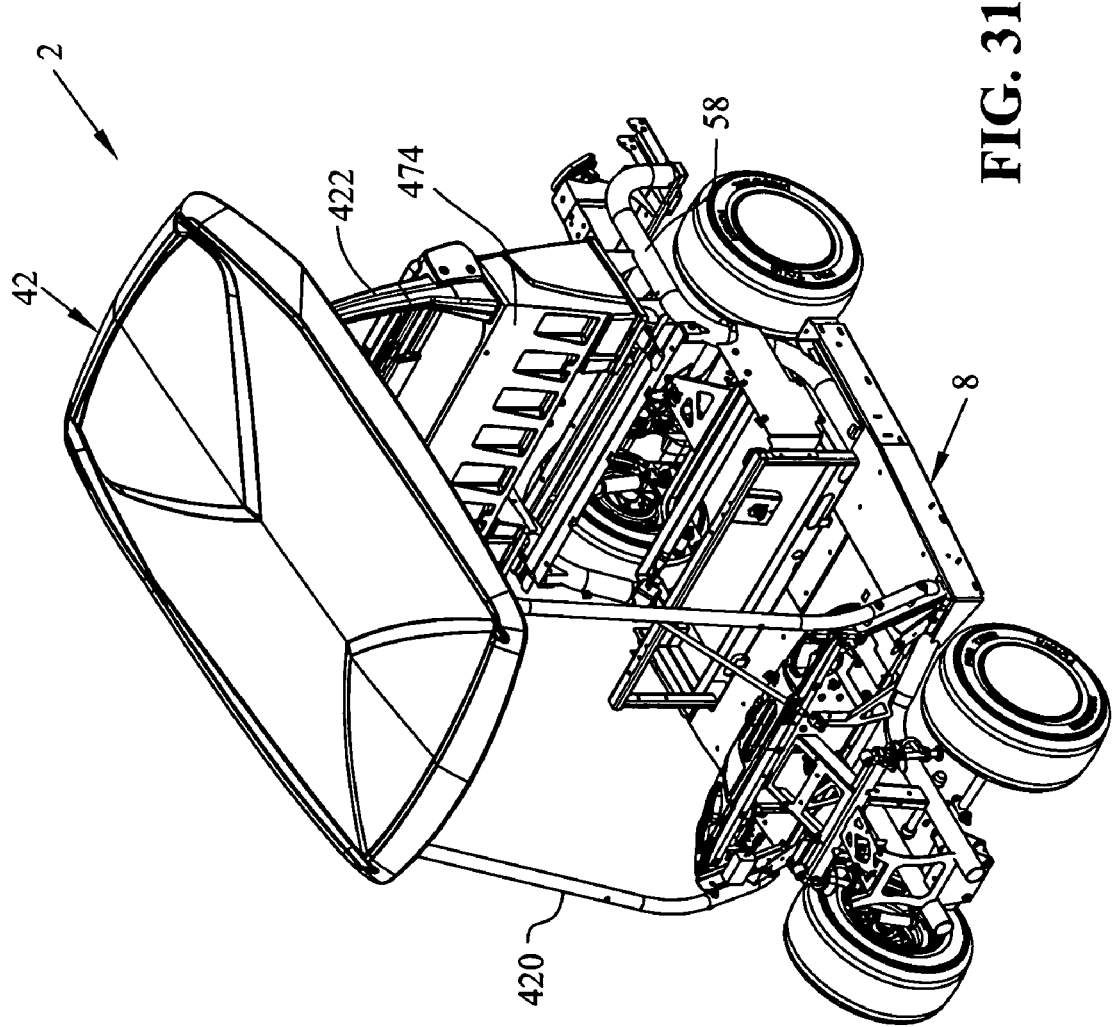
FIG. 31 is a top perspective view of the vehicle frame together with the canopy and the pedestals in position.

With respect now to FIGS. 31-34, top canopy 42 will be described in greater detail. As shown in FIG. 31, vehicle 2 includes front pedestals 420 and rear pedestals 422. Longitudinally extending frame portions 424 (FIG. 32) connect front and rear pedestals 420, 422 as best shown in FIG. 32. As shown in FIG. 32, pedestal 420 is continuous with longitudinal portion 424 and extends rearwardly towards rear pedestal 422. Canopy 42 includes integral rear corner connecting portions 430 (FIG. 34) having a receiving portion 432 to receive longitudinal portion 424 and a receiving portion 434 for receiving pedestal portion 422. In a like manner, front connector portions 440 are located at the front corners of the canopy 42 and are connected to longitudinal portion 424 to retain canopy to the pedestal assembly. As best shown in FIG. 33, longitudinal portions 424 are spaced from the canopy, and in particular from an inner surface 450 of the canopy such that the space intermediate longitudinal portion 424 and inner surface 450 can be used as a grab bar for either the driver or the passenger for ingress or egress of the vehicle.

Figure 36:
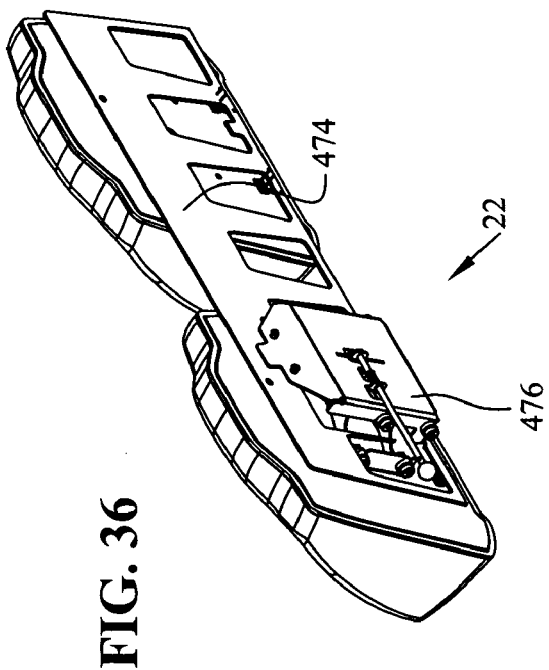
FIG. 36 shows a rear perspective view of the assembly of FIG. 35.
Figure 35:
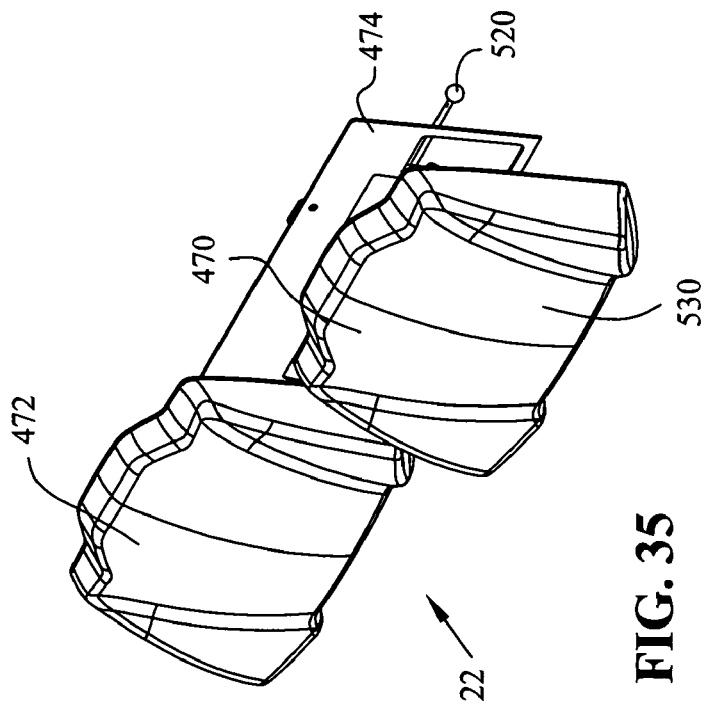
FIG. 35 shows a front perspective view of the driver and front passenger seat back assembly.

With respect now to FIGS. 35-38, seat back assembly 22 will be described in greater detail. As shown in FIGS. 35 and 36, seat back assembly 22 is shown as including a driver seat 470, a passenger seat 472 where passenger seat 472 is directly connected to a rear frame member 474 and where seat 474 is attached to rear frame 474 by way of a seat back actuator 476. Seat frame 474 is shown in FIG. 31 as spanning between rear pedestals 422.

Figure 38:
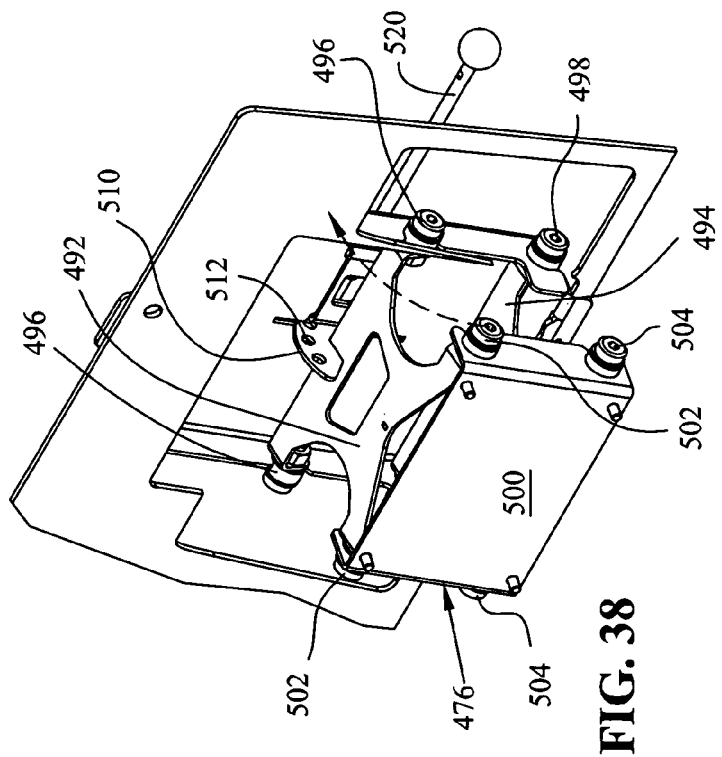
FIG. 38 shows a front perspective view of the actuator of FIG. 37.
Figure 37:
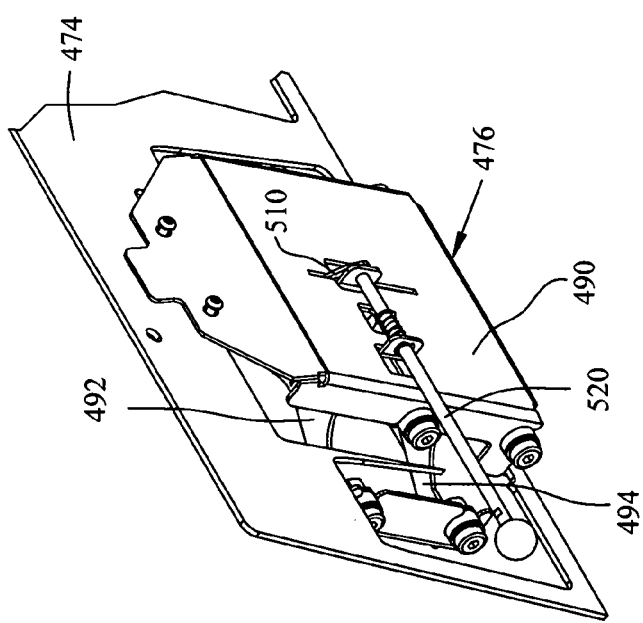
FIG. 37 shows a rear perspective view of the actuator assembly shown in FIG. 36.

As shown in FIGS. 37 and 38, actuator 476 is comprised of a rear plate 490 attached to frame 474 having an upper link 492, a lower link 494, where the upper and lower links may rotate relative to pins 496, 498, respectively. Links 492 and 494 are also pinned to a front plate portion 500 by way of pins 502 and 504 where the plate 500 rotates in an orbital manner about the arc depicted in FIG. 38. A selector plate 510 is attached to link 492 and has a plurality of selector holes 512 which cooperate with a spring loaded selector rod 520. Thus as shown in FIG. 37, the rod could be moved leftward (as viewed in FIG. 37) to release the rod 520 from one of the selector holes 512 whereby plate 500 could be rotated upwardly or downwardly to suit the driver's physique. It should be appreciated that the seat padding 530 (see FIG. 35) is attached to plate 500 such that the entire seat back is movable by way of the actuator 476.

What is claimed is:

1. A low speed vehicle, comprising:
a frame;
a driver seat mounted to the frame;
a rear facing side by side passenger seat mounted behind the driver seat, the rear facing passenger seat having a down position for use with passengers and an upright position for storage when no passengers;
a rear wall intermediate the driver seat and the rear facing passenger seat;
a security bar positioned intermediate the side by side positions of the rear facing passenger seat, the security bar having an upright position for use with passengers and a down position for use with no passengers;
a latching assembly having a first latch mechanism located on the rear facing passenger seat proximate the security bar, a second latch mechanism on the security bar, and a third latch mechanism positioned on the rear wall, wherein when the rear facing passenger seat is down, the first latch mechanism is latched to the second latch mechanism to hold the security bar up, and when the rear facing passenger seat is folded up, the first latch mechanism is unlatched from the second latching mechanism, and the first latch mechanism is latched to the third latching mechanism.

2. The vehicle of claim 1, wherein when in the down position, the security bar may be folded up with the passenger seat.

3. The vehicle of claim 1, wherein the rear facing passenger seat is defined by a seat base with side by side cushions thereon.

4. The vehicle of claim 3, wherein the seat base has an integrally molded slot therein profiled to receive the security bar when in the down position.

5. The vehicle of claim 1, further comprising a rearwardly facing back rest, positioned for supporting the passenger's backs in the rear facing passenger seat.

6. The vehicle of claim 5, wherein the rearwardly facing back rest is supported by a back frame which extends across the back of the vehicle.

7. The vehicle of claim 6, further comprising pillars extending upwardly from the frame, wherein the back frame spans the pillars.

8. The vehicle of claim 3, further comprising arms rests attached to the seat base.

9. The vehicle of claim 8, further comprising pillars extending upwardly from the frame, wherein the arm rests rotate up with the seat frame, and flank the pillars.

10. The vehicle of claim 3, further comprising seat belt buckles attached to the seat base.

11. A low speed vehicle, comprising:
a frame;
a driver seat mounted to the frame;
a rear facing side by side passenger seat mounted behind the driver seat, the rear facing passenger seat having a down position for use with passengers and an upright position for storage when no passengers;
a rear wall intermediate the driver seat and the rear facing passenger seat;
a security bar positioned intermediate the side by side positions of the rear facing passenger seat, the security bar having an upright position for use with passengers and a down position for use with no passengers, wherein when in the down position, the security bar may be folded up with the passenger seat.

12. The vehicle of claim 11, further comprising a latching assembly having a first latch mechanism located on the rear facing passenger seat proximate the security bar, a second latch mechanism on the security bar, and a third latch mechanism positioned on the rear wall, wherein when the rear facing passenger seat is down, the first latch mechanism is latched to the second latch mechanism to hold the security bar up, and when the rear facing passenger seat is folded up, the first latch mechanism is unlatched from the second latching mechanism, and is latched to the third latching mechanism.

13. The vehicle of claim 12, wherein the rear facing passenger seat is defined by a seat base with side by side cushions thereon.

14. The vehicle of claim 13, wherein the seat base has an integrally molded slot therein profiled to receive the security bar when in the down position.

15. The vehicle of claim 12, further comprising a rearwardly facing back rest, positioned for supporting the passenger's backs in the rear facing passenger seat.

16. The vehicle of claim 15, wherein the rearwardly facing back rest is supported by a back frame which extends across the back of the vehicle.

17. The vehicle of claim 16, further comprising pillars extending upwardly from the frame, wherein the back frame spans the pillars.

18. The vehicle of claim 13, further comprising arms rests attached to the seat base.

19. The vehicle of claim 18, further comprising pillars extending upwardly from the frame, wherein the arm rests rotate up with the seat frame, and flank the pillars.

20. The vehicle of claim 13, further comprising seat belt buckles attached to the seat base.

21. A low speed vehicle, comprising:
a frame;
rear vehicle operational lights mounted to the frame;
a driver seat mounted to the frame;
a rear facing passenger seat mounted behind the driver seat; and
a foot pedestal attached to the frame and having a first position for use with rear facing passengers, and an upright position for use with no passengers, the foot pedestal having an operating position angled towards the vehicle at an angle of between 5° and 10° elevated from horizontal to allow the passengers feet to be angled up relative to the ground.

22. The vehicle of claim 21, wherein the foot pedestal is at an angle of 7°.

23. The vehicle of claim 21, wherein the foot pedestal has an upright position substantially perpendicular to the ground.

24. The vehicle of claim 23, wherein the foot pedestal is held in the upright position by way of a popper pin.

25. A low speed vehicle, comprising:
a frame;
rear vehicle operational lights mounted to the frame;
a driver seat mounted to the frame;
a rear facing passenger seat mounted behind the driver seat; and
a foot pedestal attached to the frame and having a first position for use with rear facing passengers, and an upright position for use with no passengers, the foot pedestal having openings therethrough at locations proximate the rear vehicle operational lights, to view the rear vehicle operational lights from a rear thereof when the foot pedestal is in the upright position.

26. The vehicle of claim 25, wherein the foot pedestal is a molded device with integrally molded internal openings adjacent to corners of the molded device.

27. A low speed vehicle, comprising:
a frame;
a driver seat mounted to the frame;
a rear facing passenger seat mounted behind the driver seat; and
a foot pedestal attached to the frame and having a first position for use with rear facing passengers, and an upright position for use with no passengers, the foot pedestal being operational as a rear bumper in either the upright or down position.

28. A low speed vehicle, comprising:
a frame;
a driver seat, comprising a seat bottom and a seat back;
a driver seat adjustment mechanism positioned intermediate the frame and the driver seat back, the driver seat adjustment mechanism allows the seat back to move forwardly, rearwardly and vertically relative to the seat bottom, with the seat bottom being maintained in a generally horizontal position.

29. The low speed vehicle of claim 28, wherein the driver seat adjustment mechanism is comprised of a four bar linkage arrangement, with fixed links attached to the frame and the seat back and two movable links connected to the fixed links.

30. The low speed vehicle of claim 29, wherein one of the movable links includes a rotary detent member, providing multiple detented positions for the driver seat back.

31. A low speed vehicle, comprising:
a frame;
a driver seat, comprising a seat bottom and a seat back;
front pillars mounted to the frame forward of the driver seat on left and right hand sides of the vehicle, the front pillars having an upper portion above a driver's head when seated;
rear pillars mounted to the frame rearward of the driver seat on left and right hand sides of the vehicle, the rear pillars having an upper portion above a driver's head when seated;
a longitudinal frame member extending between each of the upper portions of the front and rear pillars; and
a canopy operatively connected to the front and rear pillars, the canopy being spaced from at least a part of the longitudinal frame member to allow the driver and or passenger to use the longitudinal frame members as hand holds.

32. The low speed vehicle of claim 31, wherein the longitudinal frame is continuous with the front pillars.

33. A low speed vehicle, comprising:
a frame;
a driver seat mounted to the frame;
a drivetrain;
fixed brackets mounted to opposite side of the frame;
an axle, having axle brackets attached thereto, in general lateral alignment with the fixed brackets;
trailing links extending between the fixed brackets and the axle brackets;
linear force elements extending between the axle and the frame; and
a cross link extending between and movably attached to the fixed brackets and the axle.

34. The low speed vehicle of claim 33, wherein the cross link has triangular points of connection between the fixed brackets and the axle.

35. The low speed vehicle of claim 34, wherein the cross link is defined by a generally U-shaped member.

36. The low speed vehicle of claim 35, wherein the cross link is attached to the fixed brackets at substantially equal longitudinal positions, and connected to the axle at a position longitudinally rearward from the connection to the fixed brackets.

37. The low speed vehicle of claim 36, wherein the cross link connection at the axle is by way of a bushing extending along a longitudinal axis.

38. The low speed vehicle of claim 33, wherein the vehicle is defined as a golf cart.

* * * * *